United States Patent
Fujino et al.

(10) Patent No.: US 9,518,133 B2
(45) Date of Patent: Dec. 13, 2016

(54) HYDROPHILIC POLYACRYLIC ACID (SALT) RESIN AND MANUFACTURING METHOD THEREOF

(75) Inventors: Shinichi Fujino, Himeji (JP); Satoshi Matsumoto, Himeji (JP); Kunihiko Ishizaki, Himeji (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 338 days.

(21) Appl. No.: 13/148,359

(22) PCT Filed: Feb. 8, 2010

(86) PCT No.: PCT/JP2010/051822
§ 371 (c)(1),
(2), (4) Date: Aug. 8, 2011

(87) PCT Pub. No.: WO2010/090322
PCT Pub. Date: Aug. 12, 2010

(65) Prior Publication Data
US 2012/0010372 A1 Jan. 12, 2012

(30) Foreign Application Priority Data
Feb. 6, 2009 (JP) ................. 2009-026807
Feb. 6, 2009 (JP) ................. 2009-026808

(51) Int. Cl.
*C08F 20/02* (2006.01)
*C08F 20/06* (2006.01)
*C08F 2/44* (2006.01)
*C08F 220/06* (2006.01)

(52) U.S. Cl.
CPC ............... *C08F 2/44* (2013.01); *C08F 220/06* (2013.01)

(58) Field of Classification Search
USPC ....... 525/384, 329.4, 330.1, 329.7; 524/556; 526/317.1
See application file for complete search history.

(56) References Cited

U.S. PATENT DOCUMENTS

| | | |
|---|---|---|
| 3,885,155 A | 5/1975 | Anbar |
| 4,093,776 A | 6/1978 | Aoki et al. |
| 4,367,323 A | 1/1983 | Kitamura et al. |
| 4,427,884 A | 1/1984 | Anbar et al. |
| 4,446,261 A | 5/1984 | Yamasaki et al. |
| 4,683,274 A | 7/1987 | Nakamura et al. |
| RE32,649 E | 4/1988 | Brandt et al. |
| 4,893,999 A | 1/1990 | Chmelir et al. |
| 5,185,413 A | 2/1993 | Yoshinaga et al. |
| 5,244,735 A | 9/1993 | Kimura et al. |
| 5,275,773 A | 1/1994 | Irie et al. |
| 5,276,181 A | 1/1994 | Casale et al. |
| 5,380,808 A | 1/1995 | Sumiya et al. |
| 5,438,194 A | 8/1995 | Koudijs et al. |
| 5,610,208 A | 3/1997 | Dairoku et al. |
| 5,661,299 A | 8/1997 | Purser et al. |
| 6,071,976 A | 6/2000 | Dairoku et al. |
| 6,140,395 A | 10/2000 | Hatsuda et al. |
| 6,174,978 B1 | 1/2001 | Hatsuda et al. |
| 6,187,872 B1 | 2/2001 | Yanase et al. |
| 6,187,902 B1 | 2/2001 | Yanase et al. |
| 6,228,930 B1 | 5/2001 | Dairoku et al. |
| 6,241,928 B1 | 6/2001 | Hatsuda et al. |
| 6,254,990 B1 | 7/2001 | Ishizaki et al. |
| 6,335,406 B1 | 1/2002 | Nagasuna et al. |

(Continued)

FOREIGN PATENT DOCUMENTS

| | | |
|---|---|---|
| CN | 1894286 | 1/2007 |
| JP | 4-356436 | 12/1992 |

(Continued)

OTHER PUBLICATIONS

Chinese Office Action issued Mar. 5, 2013 in corresponding Chinese Application No. 201080006204.6, with English translation.
U.S. Office Action issued Jan. 17, 2013 in U.S. Appl. No. 13/148,356.
National Center for Biotechnology Information, webpage www.ncbi.nlm.nih.gov, Jul. 2011.
Office Action issued in U.S. Appl. No. 13/148,356.
Chinese Office Action issued Aug. 27, 2013 in corresponding Chinese Application No. 201080006204.6 with English translation.

(Continued)

*Primary Examiner* — Monique Peters
(74) *Attorney, Agent, or Firm* — Wenderoth, Lind & Ponack, L.L.P.

(57) ABSTRACT

The physical properties of a water-absorbing resin with low residual monomer content are improved or stabilized, without sacrifices in productivity, production cost, stability, etc. Provided is a water-absorbing resin with low residual monomer content and excellent whiteness, wherein a water-absorbing resin consumed in large quantities in disposable diapers, etc., is preferably a sustainable and renewable water-absorbing resin that does not require excessive purification of the acrylic acid, particularly acrylic acids derived from non-fossil sources, that is the starting material of the water-absorbing resin. Disclosed is a method of manufacturing a hydrophilic polyacrylic acid (salt) resin, which is a method of manufacturing a water-absorbing polyacrylic acid resin that comprises a step in which a monomer is prepared from acrylic acid, a step in which said monomer is polymerized, and a step in which the resulting hydrous gel is dried. The polymerization is performed such that the content of hydroxypropionic acid (salt) in the monomer is 2000 ppm or less and/or the content of saturated organic carboxylic acid in the monomer is 2% by mass or less, and at least a portion of the saturated organic carboxylic acid is volatilized during and after the drying step.

13 Claims, 5 Drawing Sheets

(56) References Cited

U.S. PATENT DOCUMENTS

| | | |
|---|---|---|
| 6,388,000 B1 | 5/2002 | Irie et al. |
| 6,403,700 B1 | 6/2002 | Dahmen et al. |
| 6,444,744 B1 | 9/2002 | Fujimaru et al. |
| 6,602,950 B1 | 8/2003 | Dentler et al. |
| 6,605,673 B1 | 8/2003 | Mertens et al. |
| 6,620,889 B1 | 9/2003 | Mertens et al. |
| 6,710,141 B1 | 3/2004 | Heide et al. |
| 6,849,665 B2 | 2/2005 | Frenz et al. |
| 6,852,517 B1 | 2/2005 | Suthers et al. |
| 6,906,159 B2 | 6/2005 | Dairoku et al. |
| 6,927,268 B2 | 8/2005 | Matsumoto et al. |
| 6,987,151 B2 | 1/2006 | Gartner et al. |
| 6,998,447 B2 | 2/2006 | Irie et al. |
| 7,078,458 B2 | 7/2006 | Irie et al. |
| 7,091,253 B2 | 8/2006 | Dairoku et al. |
| 7,098,284 B2 | 8/2006 | Torii et al. |
| 7,157,141 B2 | 1/2007 | Inger et al. |
| 7,238,743 B2 | 7/2007 | Matsumoto et al. |
| 7,307,132 B2 | 12/2007 | Nestler et al. |
| 7,473,739 B2 | 1/2009 | Dairoku et al. |
| 7,683,220 B2 | 3/2010 | Matsunami et al. |
| 7,960,485 B2 | 6/2011 | Funk et al. |
| 8,071,202 B2 | 12/2011 | Furno et al. |
| 2002/0161132 A1 | 10/2002 | Irie et al. |
| 2005/0013865 A1 | 1/2005 | Nestler et al. |
| 2005/0046069 A1 | 3/2005 | Sasabe et al. |
| 2005/0070671 A1 | 3/2005 | Torii et al. |
| 2005/0113542 A1 | 5/2005 | Irie et al. |
| 2005/0209411 A1 | 9/2005 | Nestler et al. |
| 2005/0215734 A1 | 9/2005 | Dairoku et al. |
| 2005/0244312 A1 | 11/2005 | Suppes et al. |
| 2005/0288182 A1 | 12/2005 | Torii et al. |
| 2006/0036043 A1 | 2/2006 | Nestler et al. |
| 2006/0073969 A1 | 4/2006 | Torii et al. |
| 2006/0088115 A1 | 4/2006 | Chen et al. |
| 2006/0199975 A1 | 9/2006 | Dieterle et al. |
| 2006/0204755 A1 | 9/2006 | Torii et al. |
| 2006/0252899 A1 | 11/2006 | Himori et al. |
| 2007/0106013 A1 | 5/2007 | Adachi et al. |
| 2007/0129570 A1 | 6/2007 | Shima et al. |
| 2007/0148749 A1 | 6/2007 | Yasuda et al. |
| 2007/0167642 A1 | 7/2007 | Oku et al. |
| 2007/0219391 A1 | 9/2007 | Lilga et al. |
| 2007/0219521 A1 | 9/2007 | Hird et al. |
| 2007/0232760 A1 | 10/2007 | Fujimaru et al. |
| 2008/0004408 A1 | 1/2008 | Stueven et al. |
| 2008/0091048 A1 | 4/2008 | Nordhoff et al. |
| 2008/0108771 A1 | 5/2008 | Himori et al. |
| 2008/0119626 A1* | 5/2008 | Fujimaru et al. ......... 526/317.1 |
| 2008/0131945 A1 | 6/2008 | Toraya et al. |
| 2008/0161512 A1 | 7/2008 | Kawano et al. |
| 2008/0214750 A1 | 9/2008 | Stueven et al. |
| 2008/0221277 A1 | 9/2008 | Walden et al. |
| 2008/0260605 A1 | 10/2008 | Dieterle et al. |
| 2008/0280128 A1 | 11/2008 | Furno et al. |
| 2009/0023006 A1 | 1/2009 | Bub et al. |
| 2009/0068440 A1 | 3/2009 | Bub et al. |
| 2009/0105389 A1 | 4/2009 | Walden et al. |
| 2009/0118549 A1 | 5/2009 | Matsunami et al. |
| 2009/0131633 A1 | 5/2009 | Flohr et al. |
| 2009/0134357 A1 | 5/2009 | Bub et al. |
| 2009/0202805 A1 | 8/2009 | Furno et al. |
| 2009/0227741 A1 | 9/2009 | Walden et al. |
| 2009/0239995 A1 | 9/2009 | Bub et al. |
| 2009/0314258 A1 | 12/2009 | Azou |
| 2009/0325248 A1 | 12/2009 | Marx et al. |
| 2010/0009846 A1 | 1/2010 | Ikeuchi et al. |
| 2011/0034603 A1 | 2/2011 | Fujino et al. |
| 2011/0105791 A1* | 5/2011 | Kuppinger et al. ......... 562/599 |
| 2011/0144294 A1 | 6/2011 | Bub et al. |

FOREIGN PATENT DOCUMENTS

| | | |
|---|---|---|
| JP | 6-56931 | 3/1994 |
| JP | 6-122707 | 5/1994 |
| JP | 8-34757 | 2/1996 |
| JP | 2005-102533 | 4/2005 |
| JP | 2005-154741 | 6/2005 |
| JP | 2005-525445 | 8/2005 |
| JP | 2007-82476 | 4/2007 |
| JP | 2007-283175 | 11/2007 |
| JP | 2007-291351 | 11/2007 |
| JP | 2008-532943 | 8/2008 |
| JP | 2008-534695 | 8/2008 |
| JP | 2008-537555 | 9/2008 |
| JP | 2009-96812 | 5/2009 |
| WO | 02/42418 | 5/2002 |
| WO | 02/090312 | 11/2002 |
| WO | 03/008795 | 1/2003 |
| WO | 03/051940 | 6/2003 |
| WO | 03/053482 | 7/2003 |
| WO | 2004/069915 | 8/2004 |
| WO | 2005/095320 | 10/2005 |
| WO | 2006/008024 | 1/2006 |
| WO | 2006/053731 | 3/2006 |
| WO | 2006/082188 | 8/2006 |
| WO | 2006/082189 | 8/2006 |
| WO | 2006/082197 | 8/2006 |
| WO | 2006/087084 | 8/2006 |
| WO | 2006/088254 | 8/2006 |
| WO | 2006/092271 | 9/2006 |
| WO | 2006/092272 | 9/2006 |
| WO | 2006/111402 | 10/2006 |
| WO | 2006/111403 | 10/2006 |
| WO | 2006/111404 | 10/2006 |
| WO | 2006/136336 | 12/2006 |
| WO | 2007/029851 | 3/2007 |
| WO | 2007/042494 | 4/2007 |
| WO | 2007/106099 | 9/2007 |
| WO | 2007/106100 | 9/2007 |
| WO | 2007/109128 | 9/2007 |
| WO | 2007/119528 | 10/2007 |
| WO | 2007/121037 | 10/2007 |
| WO | 2007/132926 | 11/2007 |
| WO | 2008/005364 | 1/2008 |
| WO | 2008/009842 | 1/2008 |
| WO | 2008/009843 | 1/2008 |
| WO | 2008/023039 | 2/2008 |
| WO | 2008/023040 | 2/2008 |
| WO | 2008/026772 | 3/2008 |
| WO | 2008/042958 | 4/2008 |
| WO | 2008/096713 | 8/2008 |

OTHER PUBLICATIONS

Extended European Search Report issued Feb. 27, 2014, in corresponding Application No. 10738652.6.

Notice of Reasons for Rejection issued Jun. 24, 2014 in corresponding Japanese Application No. 2010-549538 with English translation.

Notice of Reasons for Rejection issued Jun. 10, 2014 in corresponding Japanese Application No. 2010-549537 with English translation.

* cited by examiner

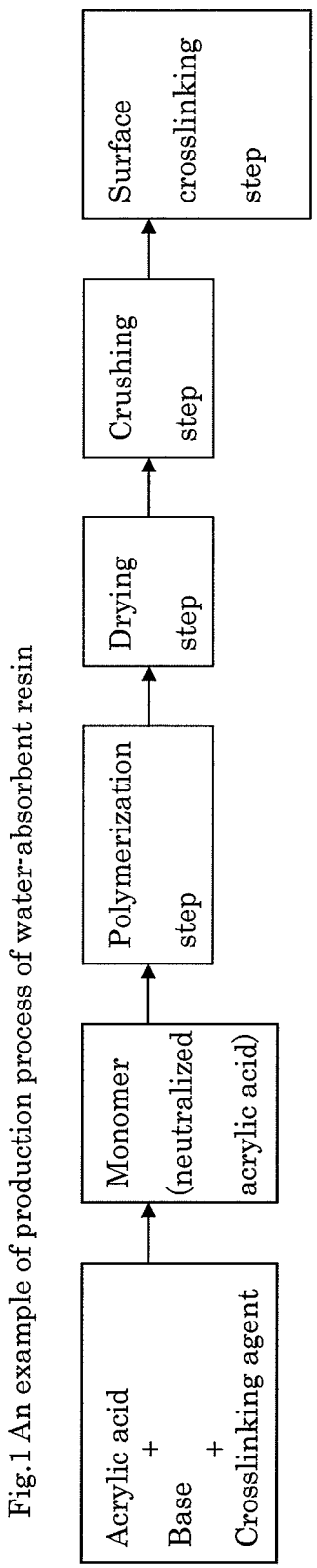

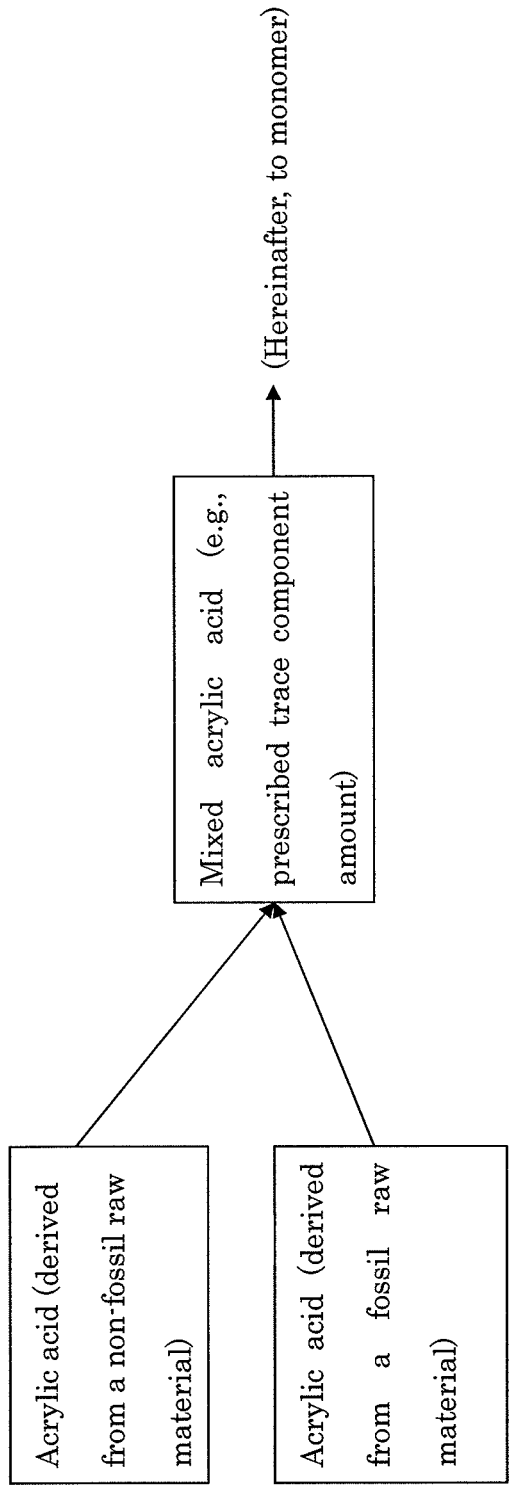
Fig.2 A plurality of acrylic acids with different raw materials/ e.g., a fossil raw material and a non-fossil raw material

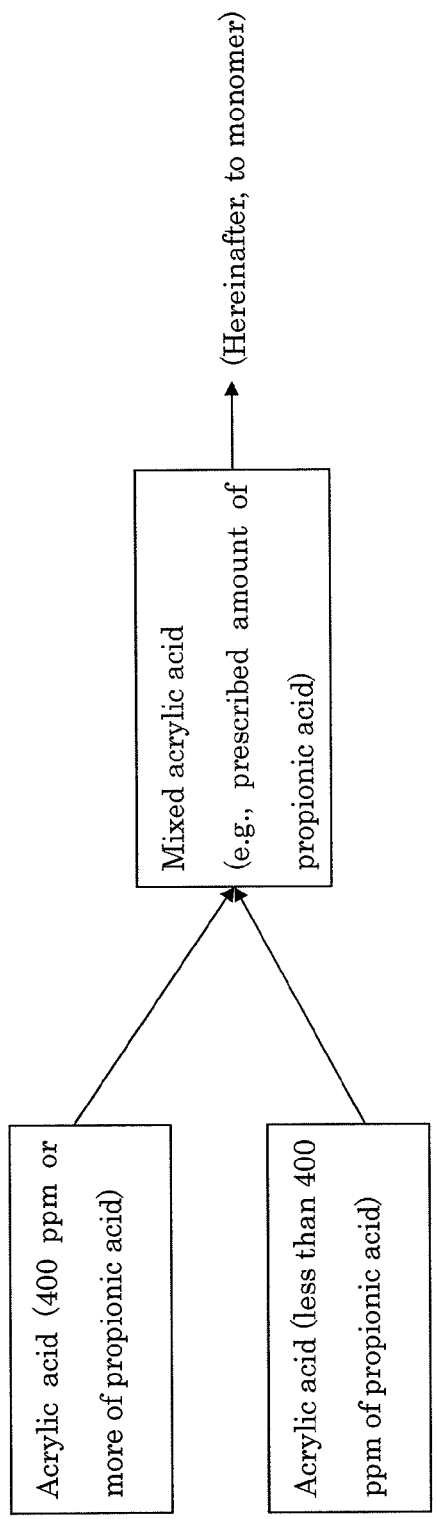
Fig. 3 A plurality of acrylic acids with different trace components/ e.g., propionic acid

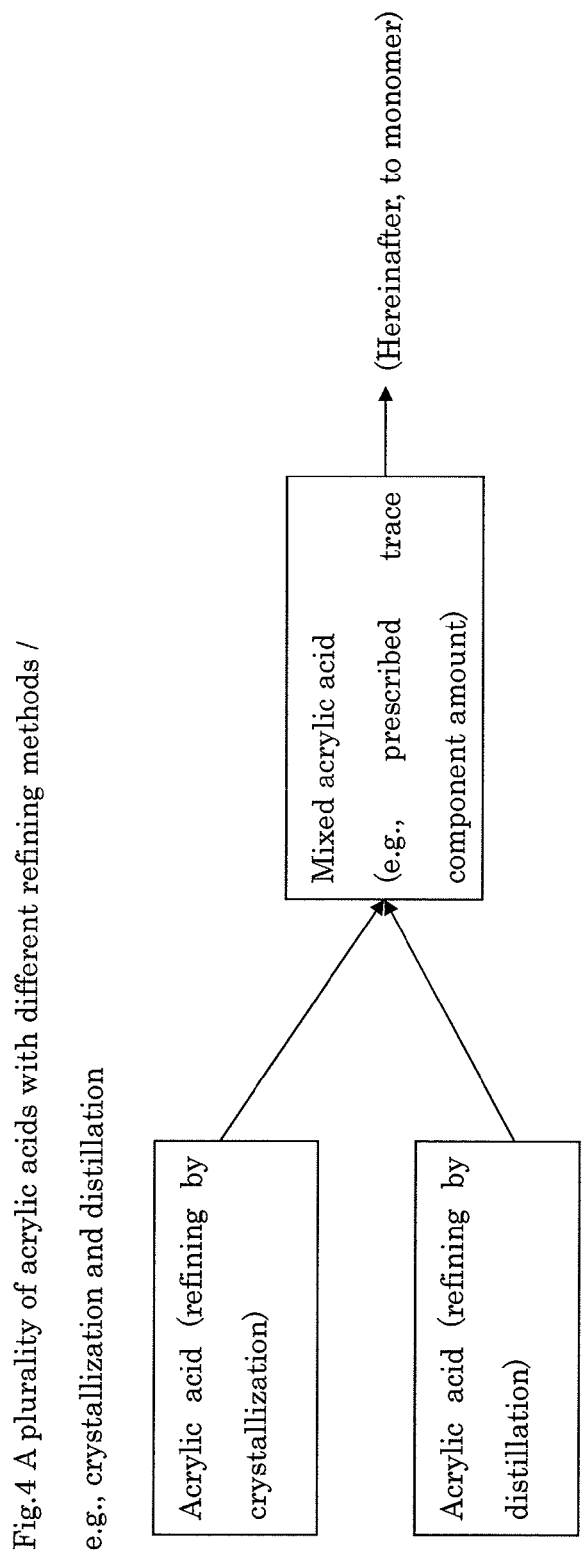
Fig.4 A plurality of acrylic acids with different refining methods / e.g., crystallization and distillation

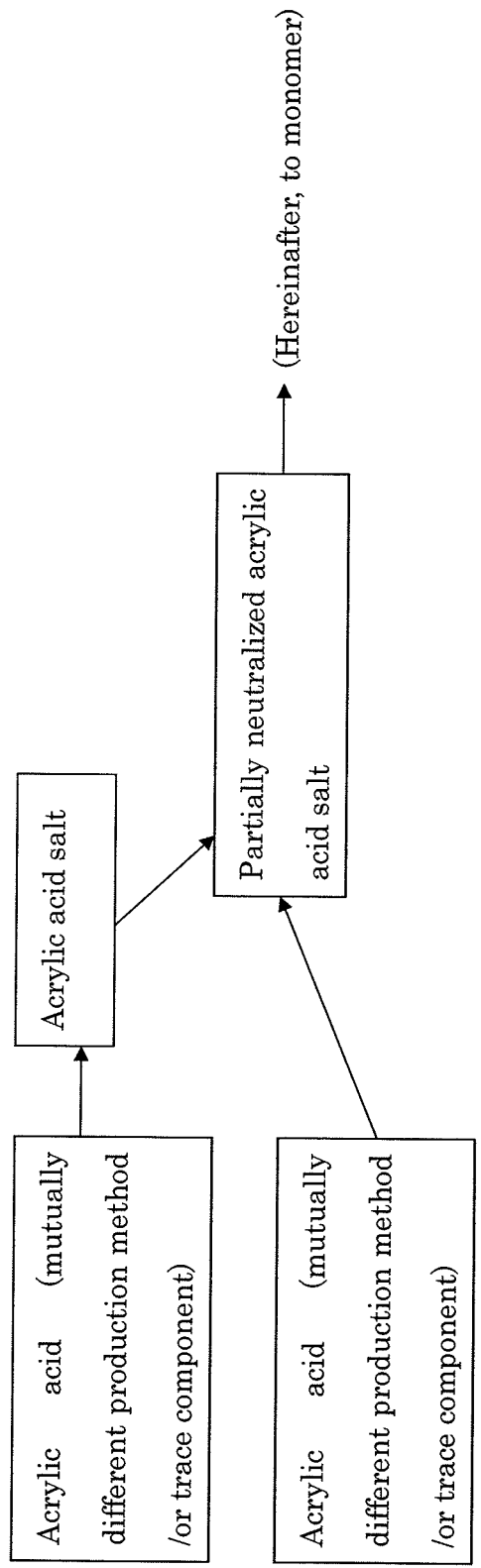
Fig. 5 A plurality of acrylic acids with different refining methods / e.g., crystallization and distillation/ one acrylic acid is mixed with another after neutralization

HYDROPHILIC POLYACRYLIC ACID (SALT) RESIN AND MANUFACTURING METHOD THEREOF

TECHNICAL FIELD

The present invention relates to a polyacrylic acid (salt)-based water-absorbent resin and a method for producing the resin. More particularly, the present invention relates to a water-absorbent resin with low residual monomer content and substantially white in color and excellent in monomer stability at the time of polymerization and a method for producing the resin.

BACKGROUND ART

A water-absorbent resin (SAP/Super Absorbent Polymer) is a water-swellable and water-insoluble polymeric gellant, which is widely and mainly used in disposable articles including an absorbent article such as a disposable diaper, a sanitary napkin, and the like; an agricultural water retaining agent; and an industrial waterproofing agent. As a material for the water-absorbent resin, varieties of monomers and hydrophilic polymers have been proposed. Among them, a polyacrylic acid (salt)-based water-absorbent resin, which is formed by using the acrylic acid and/or its salt as a monomer, is most widely used in industrial purposes due to its high water absorption performance.

As a basic physical property of the water-absorbent resin, a high water absorption coefficient is desired and such a high water absorption coefficient can be defined by a measurement method such as centrifuge retention capacity (CRC/Centrifuge Retention Capacity), free swell capacity (FSC/Free Swell Capacity), etc. As a process for producing the water-absorbent resin, a large number of methods for improving the water absorbency have been proposed.

For example, Patent Literatures 1 to 4 propose methods for polymerizing un-neutralized monomers and thereafter carrying out post-neutralization (commonly known as: neutralization after acid polymerization); Patent Literature 5 proposes a method for controlling the levelness of belt polymerization; Patent Literatures 6 and 7 propose methods for controlling a polymerization temperature in a constant range; Patent Literatures 8 to 10 propose methods for scheming pulverization methods of gel after polymerization; Patent Literature 11 proposes a method for scheming drying conditions; etc.

Further, to improve residual monomers and soluble matter, methods for obtaining water-absorbent resins by polymerizing the acrylic acid or monomers with little impurities have been proposed and for example, known are methods using the acrylic acid with a little of protoanemonine and furfural (Patent Literatures 12 and 13); a method using the acrylic acid with 20 ppm or less of allyl alcohol and allyl acrylate (Patent Literature 14); and a method using the acrylic acid with a little of an acrylic acid dimer or oligomer (Patent Literature 15). Moreover, as a countermeasure for preventing clogging of pipes due to easy precipitation of maleic acid, which is an impurity of the acrylic acid, a method (Patent Literature 16) of using the acrylic acid with 50 ppm or less of maleic acid has been proposed. Furthermore, also known are methods (Patent Literatures 17 and 18) for suppressing β-hydroxypropionic acid in the acrylic acid salts after neutralization to 1000 ppm or lower. Even more, also known are a method (Patent Literature 19) for suppressing the total amount of acetic acid and propionic acid in the acrylic acid to 400 ppm or lower in terms of acidic smell of the water-absorbent resin, and a method (Patent Literature 20) for suppressing the total amount of hydroquinone and benzoquinone in monomers to 0.2 ppm or lower in terms of coloring.

CITATION LIST

Patent Literature

Patent Literature 1: U.S. Pat. No. Re 32649
Patent Literature 2: U.S. Pat. No. 6,403,700
Patent Literature 3: U.S. Pat. No. 6,187,872
Patent Literature 4: U.S. Pat. No. 6,602,950
Patent Literature 5: U.S. Pat. No. 6,241,928
Patent Literature 6: U.S. Pat. No. 6,174,978
Patent Literature 7: U.S. Pat. No. 5,380,808
Patent Literature 8: U.S. Pat. No. 5,275,773
Patent Literature 9: U.S. Pat. No. 6,140,395
Patent Literature 10: US Patent Application Publication No. 2005/0046069
Patent Literature 11: U.S. Pat. No. 6,187,902
Patent Literature 12: U.S. Pat. No. 6,927,268
Patent Literature 13: U.S. Pat. No. 7,238,743
Patent Literature 14: International Publication No. 2006/053731
Patent Literature 15: US Patent Application Publication No. 2006/0036043
Patent Literature 16: US Patent Application Publication No. 2008/0091048
Patent Literature 17: U.S. Pat. No. 6,388,000
Patent Literature 18: U.S. Pat. No. 6,998,447
Patent Literature 19: US Patent Application Publication No. 2005/0209411
Patent Literature 20: U.S. Pat. No. 6,444,744

SUMMARY OF THE INVENTION

Problems to be Solved by the Invention

However, the methods of the above-mentioned Patent Literatures 1 to 11 involving control of a polymerization step, a gel pulverization process, a drying process, etc. are insufficient in their effects or result in increase of production cost or decrease of productivity along with installation of new facilities and addition of steps or in some cases, other physical properties are sacrificed.

Further, regarding to Patent Literatures 12 to 20 or the like, techniques of decreasing impurities of the acrylic acid have been known; however, it is difficult to simultaneously decrease all of these impurities and it leads to increase of the cost of the raw material acrylic acid and decrease of the yield. Particularly, in recent years, in terms of sustainability, production methods of chemical products derived from non-fossil raw materials but not from petroleum have been proposed; however, since the acrylic acid derived from non-fossil raw materials (natural products) differs from conventional acrylic acid derived from fossil raw materials (petroleum) in the production process and trace components, it has sometimes been very difficult to lower the impurities by a conventional method of refining the acrylic acid.

In view of the above-mentioned conventional problems of the art, an object of the present invention is to improve or stabilize the physical properties of a water-absorbent resin with low residual monomer content without sacrificing productivity, manufacturing cost, safety, and etc. Further, preferably, the present invention provides a water-absorbent resin with low residual monomer content and excellent whiteness, wherein a water-absorbent resin consumed in large quantities in disposable diapers, etc. is a sustainable and renewable water-absorbent resin obtained by using acrylic acid, a raw material for the water-absorbent resin, particularly acrylic acid derived from a non-fossil raw material without excess purification.

Solutions to the Problems

The present inventors have made various investigations to solve the above-mentioned problems and have found that use of acrylic acid obtained by dehydration reaction of hydroxypropionic acid as acrylic acid can simultaneously lower maleic acid, allyl alcohol, allyl acrylate, furfural, and protoanemonin and consequently, can obtain an excellent water-absorbent resin with low residual monomer content and extractable content, without daringly requiring specific polymerization/gel pulverization/drying as described in Patent Documents 1 to 11, etc., and, therefore, the present invention has been completed.

That is, in order to solve the above-mentioned problems, the present invention provides a method of manufacturing a water-absorbent polyacrylic acid (salt) resin involving the steps of preparing a monomer using acrylic acid, polymerizing the monomer, and drying the obtained hydrogel, wherein acrylic acid obtained by dehydration reaction of hydroxypropionic acid (salt) is used as the acrylic acid and polymerization is carried out with the content of the hydroxypropionic acid (salt) in the monomer being adjusted to 2000 ppm or lower (a first manufacturing method).

Also, in order to solve the above-mentioned problems, the present invention provides a method of manufacturing a water-absorbent polyacrylic acid (salt) resin involving the steps of: preparing a monomer using acrylic acid, polymerizing the monomer, and drying the obtained hydrogel, wherein acrylic acid obtained by dehydration reaction of hydroxypropionic acid (salt) is used as the acrylic acid; the amount of a saturated organic carboxylic acid in the monomer is adjusted to 5 wt % or lower, further to 2 mass % or lower to carry out polymerization; and at least a portion of the saturated organic carboxylic acid is volatilized and if necessary trapped in the drying step and thereafter (a second manufacturing method).

Furthermore, the present invention provides a method of manufacturing a hydrophilic resin selected from water-absorbent resins and water-soluble resins, as a broader concept of water-swellable and water-insoluble water-absorbent resins. Additionally, the first manufacturing method and the second manufacturing method are preferably simultaneously carried out.

Effects of the Invention

A water-absorbent resin with low residual monomer content is obtained by using a monomer in which acrylic acid obtained by dehydration reaction of hydroxypropionic acid (salt) is used and the content of the hydroxypropionic acid (salt) is adjusted to 2000 ppm or lower as a raw material of the water-absorbent resin. Further, since it is no need to refine the acrylic acid (particularly, the acrylic acid derived from a non-fossil raw material) for removing saturated organic carboxylic acid (particularly propionic acid), to an excess extent, the acrylic acid can be used economically and stably as a raw material of the water-absorbent resin and also an economical and sustainable water-absorbent resin can be obtained.

BRIEF DESCRIPTION OF THE DRAWINGS

FIG. 1 is an explanatory drawing showing a production process of a common water-absorbent resin.

FIG. 2 is a schematic drawing showing the steps in the case of using different the acrylic acids as raw materials.

FIG. 3 is a schematic drawing showing the steps in the case of using the acrylic acids with different impurity amounts.

FIG. 4 is a schematic drawing showing the steps in the case of using the acrylic acids refined by different refining methods.

FIG. 5 is a schematic drawing showing the steps in the case of using the acrylic acids refined by different refining methods and involving a step of neutralizing solely one of the acrylic acid and thereafter mixing the acrylic acid with another.

Hereinafter, a method of manufacturing a water-absorbent resin will be described and the following description is applicable for a water-absorbent resin within a range where the water-absorbent resin is water-soluble (a hydrophilic resin 100% soluble in water).

MODE FOR CARRYING OUT THE INVENTION

The still other objects, features and excellent points of the present invention will be sufficiently understood from the following description. Hereinafter, the present invention will be described in detail.

(1) Definition of Terms (a) "Water-Absorbent Resin"

Water-absorbent resin is a swellable and water-insoluble polymeric gallant. The water absorbency (CRC) is generally 5 g/g or higher, preferably 10 to 100 g/g, and more preferably 20 to 80 g/g. Further, soluble components (extractables) are generally 0 to 50 mass % or lower, preferably 0 to 30 mass % or lower, more preferably 0 to 20 mass %, and even more preferably 0 to 10 mass %.

The water-absorbent resin is not limited to be embodiments of 100 mass % of a polymer and may contain other additives (described below) to the extent of retaining the above-mentioned characteristics. That is, even a water-absorbent resin composition is generally named as a water-absorbent resin in the present invention. The content of the polyacrylic acid (salt)-based water-absorbent resin is preferably 70 to 99.9 mass % in the entire water-absorbent resin, more preferably 80 to 99.7 mass %, and even more preferably 90 to 99.5 mass %. The components other than the water-absorbent resin are preferably water in terms of the water absorption speed and impact resistance of powder (particles) and may include, if necessary, additives described below.

(b) "Polyacrylic Acid (Salt)"

Polyacrylic acid (salt) is a polymer containing mainly the acrylic acid (salt) as a repeating unit of the polymer. The acrylic acid (salt) as a monomer excluding a cross-linking agent is in an amount of indispensably 50 to 100% by mole, preferably 70 to 100% by mole, more preferably 90 to 100% by mole, and even more preferably substantially 100% by mole. The acrylic acid salt as the polymer indispensably contains a water-soluble salt and preferably contains a monovalent salt, more preferably an alkali metal salt or ammonium salt, particularly preferably an alkali metal salt, and even more preferably sodium salt.

(c) "Early-Phase Coloring of Water-Absorbent Resin"

This is a color of a water-absorbent resin immediately after production of the water-absorbent resin in a plant or after shipment to users. Generally, defined by control of the color before shipment from a plant (L/a/b value, YI value, WB value, and etc.)

(d) "Coloring Over Time of Water-Absorbent Resin"

A problem of gradual coloring (generally, yellowing or brownish discoloring) of a water-absorbent resin in an unused state or un-swollen state for a long term preservation or distribution after the above-mentioned (c). For example, coloring of the water-absorbent resin in an unused diaper and it may possibly result in degrade of the product value of a disposable diaper. Since it is a problem for several months or several years at room temperature, it is examined by an accelerating test (high temperature and high humidity) described below.

(e) "EDANA" and "ERT"

This is the abbreviation of European Disposables and Nonwovens Associations. A measurement method (ERT/EDANA Recommended Test Method) of a water-absorbent resin on the basis of European Standards (almost Global Standards) as defined below. Reference to the original text of ERT (several pages in English), a published document (revised in 2002), for details.

(f) "CRC" (ERT 441.2-02).

CRC is centrifuge retention capacity of a water-absorbent resin. CRC is a water absorbency measured by freely swelling the water-absorbent resin in an 0.9 mass % aqueous saline solution for 30 minutes and thereafter draining the resin by centrifugal separation (unit; g/g).

(g) "AAP" (ERT 442.2-02).

A water absorbency against pressure of a water-absorbent resin. A water absorbency (unit: g/g) in the case of swelling the water-absorbent resin in an 0.9 mass % aqueous saline solution for 1 hour under a load of 21 gf/cm$^2$.

(h) "Extractables" (ERT 470.2-02).

Soluble components of a water-absorbent resin. Measurement is carried out by adding 1 g of the water-absorbent resin to 200 g of an 0.9 mass % aqueous saline solution, stirring the solution for 16 hours, and measuring the amount of a dissolved resin (polymer) by pH titration (unit: mass %).

(i) "FSC" (ERT 440.2-02).

A free swelling capacity of a water-absorbent resin. The water absorbency of the water-absorbent resin to an 0.9 mass % aqueous saline solution without draining by centrifugal separation.

(j) "Residual Monomers (ERT 410.2-02)"

The amount of residual monomers eluted to an 0.9 mass % aqueous saline solution from a water-absorbent resin is measured by liquid chromatography.

(k) "Particle Size Distribution (ERT 420.2-02)"

Particle size distribution measured by sieving classification.

(l) Other Definitions of Water-Absorbent Resin in EDANA (Standardized in 2002)

"pH" (ERT 400.2-02)

The pH of a water-absorbent resin.

"Moisture Content" (ERT 430.2-02)

The water content of a water-absorbent resin.

"Flow Rate" (ERT 450.2-02)

The flow rate of a water-absorbent resin powder.

"Density" (ERT 460.2-02)

The bulk specific density of a water-absorbent resin.

"Respirable Particles" (ERT 480.2-02)

"Dust" (ERT 490.2-02)

(2) Monomer (Excluding a Cross-Linking Agent)

A monomer of the present invention contains the above-mentioned acrylic acid or its salt as a main component and in terms of water absorption characteristics and decrease of the residual monomers, the acid groups of a polymer are preferable to be neutralized and the neutralization ratio is 10 to 100% by mole, further 30 to 95% by mole, particularly 50 to 90% by mole, and even more preferably 60 to 80% by mole. The neutralization may be carried out for the polymer (hydrogel) after polymerization or for the monomer; however, in terms of productivity and improvement of AAP, neutralization of the monomer is preferable. Consequently, the monomer preferable in the present invention is a partially neutralized salt of the acrylic acid. In addition, "monomer" in the present invention means one kind of monomer or a mixture of a plurality of monomers or a monomer composition.

In terms of acid smell derived from a saturated organic acid (particularly propionic acid) described below, the neutralization ratio is more preferable as it is higher and in terms of the removal at the time of drying, the neutralization ratio is more preferable as it is lower. Accordingly, in terms of the acid smell, it is one of preferable embodiments that a portion of the saturated organic carboxylic acid is evaporated or removed by adjusting the neutralization ratio at the time of polymerization, more preferably, the neutralization ratio before the drying to be 80% by mole or lower, more preferably 70% by mole or lower, and even more preferably 60% by mole or lower and thereafter a basic substance is added to the polymer powder surface.

With respect to the neutralization ratio, in the case a saturated organic carboxylic acid, particularly, a carboxylic acid, in an amount of a range described below (e.g., 2 mass % or lower and further 2000 ppm or lower) remains in the water-absorbent resin to be obtained, that is, in the case of the saturated organic carboxylic acid, particularly, propionic acid, contained in the monomer cannot be removed sufficiently after the polymerization, even if the saturate organic carboxylic acid in the same amount (ppm) is contained in the water-absorbent resin, the ratio of the volatile un-neutralized carboxylic acid is high in the case of low neutralization and so that the problem of malodor may occur. Therefore, in order to suppress acid smell, the neutralization ratio of the obtained polyacrylic acid salt type water-absorbent resin is controlled to be such a high final neutralization ratio as to keep in a range of 10 to 100% by mole, or further 30 to 95% by mole, and it is preferable to be increased successively to 65% by mole or higher, 70% by mole or higher, 75% by mole or higher, 80% by mole or higher, 85% by mole or higher, and 90% by mole or higher. Such adjustment of the neutralization ratio is performed by adding a base during the polymerization of the monomer or after polymerization.

Further, in the present invention, a hydrophilic or hydrophobic unsaturated monomer may be used besides an acrylic acid (salt). Monomers usable may include methacrylic acid, maleic anhydride, 2-(meth)acrylamide-2-methylpropanesulfonic acid, (meth)acryloxyalkane sulfonic acid, N-vinyl-2-pyrrolidone, N-vinylacetamide, (meth)acrylamide, N-isopropyl(meth)acrylamide, N,N-dimethyl(meth)acrylamide, 2-hydroxyethyl (meth)acrylate, methoxypolyethylene glycol (meth)acrylate, polyethylene glycol (meth)acrylate, stearyl acrylate, and their salts.

(3) Crosslinking Agent (Inner Crosslinking Agent)

In the present invention, in terms of the water-absorbent properties, use of a crosslinking agent (i.e.; inner crosslinking agent) as a monomer is particularly preferable. The crosslinking agent is used in an amount of 0.001 to 5% by mole, preferably 0.005 to 2% by mole, more preferably 0.01 to 1% by mole, and even more preferably 0.03 to 0.5% by mole to the monomer excluding the cross-linking agent, in terms of physical aspect.

Examples usable as the cross-linking agent are one or more of polymerizable cross-linking agents polymerizable with the acrylic acid, reactive cross-linking agents reactive on a carboxyl group, and cross-linking agents having both of these properties. Concrete examples are, as a polymerizable cross-linking agent, compounds having at least two polymerizable double bonds in a molecule such as N,N'-methylenebisacrylamide, (poly)ethylene glycol di(meth)acrylate, (polyoxyethylene)trimethylolpropane tri(meth)acrylate, poly(meth)allyloxyalkanes, and etc. Further, examples of the reactive cross-linking agent are covalent-binding cross-linking agents such as polyglycidyl ether (ethylene glycol diglycidyl ether or the like), poly alcohols (propanediol, glycerin, sorbitol, etc.), and ion-binding cross-linking agents such as polyvalent metal compounds of aluminum or the like. Among these cross-linking agents, in terms of water-absorbent properties, cross-linking agents polymerizable with the acrylic acid, particularly, acrylate type, allyl type, and acrylamide type polymerizable cross-linking agents are preferably used.

(4) Neutralizing Salt

Preferable examples as a basic substance to be used for neutralization of the acrylic acid may include monovalent bases such as alkali metal hydroxides such as sodium hydroxide, potassium hydroxide, and lithium hydroxide, and alkali metal (hydrogen) carbonates such as sodium (hydrogen) carbonate, potassium (hydrogen) carbonate, etc. Particularly, in terms of decrease of the residual monomers, neutralization into an alkali metal acrylate especially with sodium hydroxide is preferable. The conditions or the like in these neutralization treatments are exemplified in International Publication No. 2006/522181 and the disclosed conditions are applicable for the present invention. The neutralization temperature is properly determined in a range of 10 to 100° C., more particularly 30 to 90° C., and a neutralization method described below is preferable to decrease the residual monomers.

(5) Hydroxypropionic Acid (Also Known as; 2- OR 3-Hydroxypropionic Acid/Abbreviated as HPA)

In this application, acrylic acid obtained by dehydration reaction of hydroxypropionic acid is essentially used as a monomer of acrylic acid. The hydroxypropionic acid is 2- or 3-hydroxypropionic acid and is preferably obtained by fermentation of a non-fossil raw material.

The amount of the acrylic acid derived from HPA is not limited to 100% by mole in the entire acrylic acids and it is generally used in an amount of 1% by mole or more, 10% by mole or more, 20% by mole or more, 30% by mole or more, 50% by mole or more, 70% by mole or more, or 90% by mole or more. Further, other acrylic acids (acrylic acids derived from a fossil material or a non-fossil raw material) besides the acrylic acid obtained by dehydration reaction of hydroxypropionic acid may be used in combination in a range described below. The acrylic acid derived from HPA to be used in the present invention may be obtained by a method described below and may be an acid type (unneutralized acrylic acid), a neutralized type (acrylic acid salt), or a mixture (partially neutralized acrylic acid), and preferably, unneutralized acrylic acid is first used for preparation of a monomer, which is then neutralized if necessary and polymerized.

Among six kinds of impurities, protoanemonine, allyl acrylate, allyl alcohol, aldehyde (particularly furfural), maleic acid, and benzoic acid in acrylic acid, 1 or more, 2 or more, 3 or more, 4 or more, 5 or more, and 6 are in an amount of 0 to 20 ppm (based on mass, the same applies hereinafter), each; preferably 0 to 10 ppm, each; more preferably 0 to 5 ppm, each; furthermore preferably 0 to 3 ppm, each; moreover preferably 0 to 1 ppm, each; and even more preferably ND (Not Detected). Further, the total amount (to acrylic acid amount) of these protoanemonine, allyl acrylate, allyl alcohol, aldehyde, maleic acid, and benzoic acid is preferably 100 ppm or lower, more preferably 0 to 20 ppm, and furthermore preferably 0 to 10 ppm. A preferable method for controlling these trace components and propionic acid amount is use of the acrylic acid derived from a non-fossil raw material as described below.

If the quantity of the above-mentioned impurities is high, the residual monomers and soluble components in the water-absorbent resin may be increase or coloring may be caused. At the same time, in terms of residual monomers, the water amount is preferably 20 mass % or lower, more preferably 1 mass % or lower, furthermore preferably 0.5 mass % or lower, and even more preferably 0.2 mass % or lower. In the case of a method using a monomer (acrylic acid) as an aqueous solution exemplified in Example 2 (an aqueous 62 mass % acrylic acid solution) of International Publication No. 2008/023039, etc., residual monomers tend to be increased.

Conventionally, in order to control the amount of these impurities in acrylic acid to be low, it is accompanied with a decrease of yield, etc., and it includes not only difficulty in terms of technical and cost aspects but also has an increase of other impurities in some cases. Further, in a purification step, an extra step such as hydrazine treatment (aldehyde removal treatment) for removing furfural etc., is required in some cases. In order to solve such problems, the present invention uses acrylic acid obtained by dehydration reaction of hydroxypropionic acid, whereas a commercialized acrylic acid is entirely acrylic acid obtained by propylene vapor-phase oxidation.

That is, industrial manufacturing methods known as conventional methods for manufacturing acrylic acid are the contact vapor-phase oxidation method of propylene and/or propane, the ethylene cyanohydrine method, the high pressure Reppe method, the improved Reppe method, the ketene method, the acrylonitrile hydrolysis decomposition method, etc., and among them, the contact vapor-phase oxidation method of propylene and/or propane is most often employed. In the present invention, acrylic acid obtained by the contact vapor-phase oxidation method is not used but the dehydration reaction product of hydroxypropionic acid is used as at least a portion of acrylic acid.

The dehydration reaction of hydroxypropionic acid is carried out in the presence or absence of a catalyst, and an acid catalyst is used as such a catalyst. The dehydration reaction may be carried out at a heating temperature of 100 to 300° C., further preferably 150 to 250° C. under normal pressure or reduced pressure to obtain acrylic acid. A hydroxypropionic acid salt may be any one of alkali metal salts, alkaline earth salts, and a combination of these salts. Examples of typical salts include a sodium salt and a calcium salt. Dehydration for producing an α, β-unsaturated carboxylic acid or its salt can be carried out in an aqueous medium. It is because hydroxypropionic acid is soluble in an aqueous medium.

Optionally, along with heating of an aqueous solution, a dehydration enzyme is added thereto and accordingly, dehydration of an acid or acidic salt can be reinforced to form α, β-unsaturated carboxylic acid or its salt. Use of an acidic or basic material can catalyze the dehydration process in the aqueous medium. The dehydration catalyst may be a neutral, acidic, or basic material for promoting dehydration. Examples of the neutral catalyst include calcium phosphate, calcium lactate, and calcium 3-hydroxypropionate. Examples of other usable catalysts include aluminum oxide, silicon oxide, titanium oxide, zirconium oxide, a zeolite, and other Lewis acids. An amine is a basic compound usable as a catalyst. In the case where fermentation bouillon is used for producing hydroxypropionic acid, a basic amine advantageously serves both functions as an extractant for separating hydroxypropionic acid from aqueous fermentation bouillon and as a dehydration catalyst. Examples of the amine suitable for the process include tricaprylamine (TCA), tridecylamine (TDA), and tridodecylamine (TDDA). Further, use of another externally producible basic material can cause dehydration. Concretely, the materials may be metal oxides and hydroxides, and for example, calcium oxide and calcium hydroxide are basic materials capable of reinforcing and assisting dehydration. An acid catalyst may be a gaseous or liquid strong mineral acid, for example, hydrochloric acid, sulfuric acid, or phosphoric acid. An insoluble acid resin, for example, AMBERLYST (registered trade name) resins, NAFION (registered trade name) resins, and acidic DOWEX (registered trade name) resins, can be employed as the catalyst. A particularly usable acid catalyst is phosphoric acid.

α, β-unsaturated carboxylic acid may be prepared by dehydration carried out by vapor conversion (that is, steam phase reaction). In such a method, an aqueous solution containing hydroxypropionic acid is evaporated at relatively high temperature, preferably in the presence of a dehydration catalyst and accordingly, hydroxypropionic acid can be converted into acrylic acid. Concrete dehydration methods are disclosed in the following methods 1 to 8 etc., which may be properly employed. In these dehydration steps, it is preferable to use a polymerization inhibitor and further to remove the inhibitor.

Method 1) International Publication No. 2002/090312 (a method of heating an ammonium salt of 3-hydroxycarboxylic acid to obtain 3-hydroxycarboxylic acid, which is thereafter dehydrated to obtain acrylic acid);

Method 2) International Publication No. 2003/08795 (a method of preparing an aqueous solution containing a 3-hydroxycarboxylic acid salt, heating the solution to dehydrate the salt, and forming α, β-unsaturated carboxylic acid or its salt);

Method 3) International Publication No. 2005/095320 (a method of heating an aqueous solution of hydroxycarboxylic acid (including lactic acid, 3HPA) and its derivative);

Method 4) International Publication No. 2007/106099 (a method of supplying an ammonia salt of 3-hydroxy compound (e.g., 3-hydroxypropionic acid) in substantially liquid phase to a reactor at a prescribed flow rate and temperature and causing reaction of the substance in the inside of the reactor substantially without inert gas flow therein);

Method 5) US Patent Application Publication No. 2007/219391 (a method of manufacturing acid/amide/ester by continuously removing water and dehydrating a salt such as β-HPA);

Method 6) International Publication No. 2007/106100 (a method of supplying a β-hydroxy compound (e.g., 3-hydroxypropionic acid) in substantially liquid phase to a reactor at a prescribed flow rate and temperature, evaporating the compound at reaction temperature or more, and thereby causing reaction of the substance in the inside of the reactor substantially without inert gas flow therein);

Method 7) International Publication No. 2008/042958 (a method of forming a single phase mixture from an ammonium salt of 3-hydroxycarboxylic acid, water, and nonaqueous solvent (e.g., 2-pyrrolidone), precipitating an ammonium salt of β-hydroxycarboxylic acid by heating the mixture, and forming a reaction mixture containing 3-hydroxycarboxylic acid and the nonaqueous solvent; etc. can be exemplified.

In the dehydration reaction, unneutralized hydroxypropionic acid or its salt (particularly, a monovalent salt, more preferably a sodium salt or an ammonium salt) is used and a solvent may or may not be used. The obtained acrylic acid may be purified by crystallization, distillation, etc., and a method of crystallizing acrylic acid may be carried out in a layer state or dispersion state with a continuous manner or a batch manner and it is disclosed in, for example, International Publication No. 2008/023039. In addition, the generation of a byproduct, acrylamide, needs to be paid attention in dehydration of the ammonium salt of hydroxypropionic acid.

(6) Method of Manufacturing Hydroxypropionic Acid

Hydroxypropionic acid (particularly, 3-HPA) is preferably obtained by a fermentation method and examples of a raw material for that include β-alanine, lactic acid, glycerin, glucose, starch, cellulose, etc., and preferably glucose or glycerin. Such a fermentation method of 2- or 3-hydroxypropionic acid can be carried out by, for example, the following manufacturing methods 1 to 5. Further, hydroxypropionic acid may be obtained by contact oxidation with an oxidizing agent according to method 6, without employing the fermentation method; however, in terms of control of the purity of acrylic acid to be used in the present invention, the fermentation method may be employed.

Method 1) U.S. Pat. No. 6,852,517 (obtaining β-HPA from glycerin by using two kinds of enzymes);

Method 2) International Publication No. 2002/042418 (a method of using cells containing lactyl CoA dehydrase activity and 3-hydroxypropionyl CoA dehydrase activity. β-Alanine produced from aspartate as a raw material of β-HPA, etc.);

Method 3) International Publication No. 2007/042494 (β-HPA from β-alanine by a specified enzyme);

Method 4) JP-A-2007/082476 (β-HPA from glycerin by a specified enzyme);

Method 5) JP-A-2005-102533 (a method of obtaining 3-hydroxypropionaldehyde by dehydrating glycerin and oxidizing the 3-hydroxypropionaldehyde in a liquid phase to manufacture 3-hydroxypropionic acid);

Method 6) JP-A-4-356436 (a method of manufacturing lactic acid from glycerin using an oxidizing agent); etc. can be exemplified.

Cells to be used for obtaining hydroxypropionic acid may be any species including those listed in taxonomic web page (www.ncbi.nlm.nih.gov) of National Institutes of Health, sponsored by the US government. The cells may be eukaryotic cells or prokaryotic cells. For example, genetically-modified cells may be mammalian cells (e.g., cells of human, mouse, and cow), plant cells (e.g., cells of corn, rice, and soybean), fungus cells (e.g., cells of *Aspergillus* and *Rhizopus*), yeast cells, or bacterial cells (e.g., cells of lactic acid *bacillus, Lactococcus, Bacillus, Escherichia*, and *Clostridium*). The cells may be microbes. The term "microbes" used herein refers to any microscopic organisms, which include, but are not limited to, bacteria, alga, fungi, and protozoa. Consequently, *Escherichia coli*, budding yeast, *Kluveromyces lactis, Candida blankii, Candida rugosa*, and *Pichia postoris* are supposed to be microbes and usable as described herein.

Commonly, cells are genetically modified to produce a specified organic compound. In general, cells to be genetically modified as to produce a specified organic compound contain one or a plurality of exogenous nucleic acid molecules encoding polypeptides having a specified enzyme activity. For example, a microbe may include an exogenous nucleic acid encoding a polypeptide having 3-hydroxypropionyl CoA dehydrase activity. In this case, acrylyl CoA is converted into 3-hydroxypropionic acid CoA and it results in production of 3-hydroxypropionic acid. It should be noted that cells have exogenous nucleic acid molecules encoding a polypeptide having an enzyme activity catalyzing production of a compound that is not commonly produced by the cells. Alternatively, cells may have exogenous nucleic acid molecules encoding a polypeptide having an enzyme activity catalyzing production of a compound that is commonly produced by the cells. In this case, genetically modified cells can produce the compound in a larger quantity or more efficiently than the similar cells which are not genetically modified.

Commonly, cells as microbes within the scope of the present invention catalyze a carbon source of hexose as glucose. However, cells can catalyze a variety of carbon sources as pentoses (e.g., ribose, arabinose, xylose, and lyxose), fatty acids, acetates, or glycerols. That is, for the cells within the scope of the present invention, a variety of carbon sources can be used.

(7) Propionic Acid ($C_2H_5COOH$)

In this application, it is also preferable that a prescribed amount or more of a saturated aliphatic carboxylic acid, more preferably a $C_2$ to $C_5$ saturated aliphatic carboxylic acid, particularly preferably acetic acid ($CH_3COOH$) and propionic acid ($C_2H_5COOH$), and even more preferably propionic acid may be contained in the monomer. The amount of the saturated aliphatic carboxylic acid, particularly propionic acid, to be contained is preferably 300 ppm or more, more preferably 400 ppm or more, further preferably 500 ppm or more, moreover preferably 650 ppm or more, particularly preferably 800 ppm or more, and even more preferably 1000 ppm or more. The upper limit is commonly preferably 5 mass % or lower, more preferably 2 mass % or lower; further preferably 1 mass % or lower, particularly preferably 0.5 mass % or lower, and even more preferably 0.3 mass % or lower. In the case where the amount of propionic acid to be contained is low, the effect of improving the water absorption capacity is slight or extremely slight. On the other hand, in the case where the amount of propionic acid is high, it is disadvantageous in terms of cost and there is a problem of odor (acid smell) due to residual propionic acid. Further, in the case of an excess amount of propionic acid, other physical properties such as extractables may possibly be deteriorated relatively to the improvement of the water absorption capacity.

In the case where the excess purification of acrylic acid (particularly acrylic acid containing a relatively high amount of propionic acid, it results in a problem of a decrease of yield and an increase of cost, and therefore, it is preferable to remain propionic acid in a prescribed amount or higher (e.g., 300 ppm or more) in the acrylic acid after purification. It is preferable in the present invention that propionic acid, an odor causative substance, is allowed to be contained in a prescribed amount at the time of polymerization and thereafter is removed from the water-absorbent resin after polymerization rather than removing propionic acid from the acrylic acid. Accordingly, the upper and lower limits may be determined properly in the above-mentioned ranges in accordance with the balance among improvement effects of water absorption capacity, acid smell, and other physical properties and it may be determined properly in a range of 300 ppm to 1 mass %, 500 ppm to 1 mass %, 650 ppm to 1 mass % (further 0.5 mass %), and 800 ppm to 1 mass % (further 0.5 mass %).

Additionally, a saturated aliphatic carboxylic acid means a concept including a saturated aliphatic carboxylic acid salt and propionic acid means a concept including a propionic acid salt and in a neutralized acrylic acid salt monomer, the propionic acid is also neutralized approximately the same neutralization ratio as that of the monomer and in this application, the total amount of unneutralized propionic acid and its salt (particularly monovalent salt) in the monomer is defined as propionic acid amount. In this connection, in the case where a monomer is obtained by neutralization of acrylic acid containing a prescribed amount (ppm) of a saturated aliphatic carboxylic acid, the content (ppm) of the saturated aliphatic carboxylic acid in the monomer (acrylic acid salt) after neutralization is substantially the same as that of acrylic acid before neutralization.

It is sufficient that such propionic acid is contained in the prescribed amount in the monomer at the time of polymerization and, therefore, the prescribed amount of propionic acid may be added in the preparation step of the monomer or by the time of polymerization after the preparation. It is preferable to previously dissolve or add propionic acid in the acrylic acid, the main component in the monomer, particularly in the unneutralized acrylic acid for simplifying the step of adding propionic acid, and further from aspects of uniform mixing and dissolution of propionic acid in the monomer. Propionic acid may be dissolved in the acrylic acid or acrylic acid containing a prescribed amount of propionic acid as an impurity may be used as it is. That is, a monomer containing the prescribed amount of propionic acid may be obtained by using acrylic acid containing 300 ppm or higher of propionic acid, further 400 ppm or higher of propionic acid, at least partially, for example, 1 mass % or more, 10 mass % or more, 20 mass % or more, or 30 mass % or more in the total monomer or in the total acrylic acid.

The effect of improving water absorbency (CRC) by propionic acid is caused at the time of polymerizing the monomer; however even if propionic acid is added to the water-absorbent resin after polymerization, not only no effect of improving water absorption capacity is observed but also a problem of odor is caused. In the case where the amounts of propionic acid and acetic acid are too large, it is difficult to remove the acids after polymerization or during polymerization, particularly at the time of drying and the problem of odor due to the remaining may be caused. Consequently, from an aspect of the balance with odor, propionic acid and acetic acid are preferable to be used in the above-mentioned ranges.

That is, in the present invention, acrylic acid obtained by common vapor-phase oxidation of propylene sometimes contains several tens ppm to 300 ppm of propionic acid as an impurity; however in this application, acrylic acid (unneutralized acrylic acid) containing propionic acid in an amount more than before is preferable to be used. That is, the acrylic acid containing propionic acid is preferable to be used and the amount of propionic acid in the acrylic acid is preferably 300 ppm or more, more preferably 400 ppm or more, further preferably 500 ppm or more, still further preferably 650 ppm or more, particularly preferably 800 ppm or more, and even more preferably 1000 ppm or more. The amount of propionic acid is preferably 2 mass % or lower, more preferably 1 mass % or lower, and further preferably 0.5 mass % or lower.

In order to adjust the amount of propionic acid in the acrylic acid, from aspects of cost and steps, a plurality of acrylic acids with different amounts of propionic acids are preferable to be used to prepare a monomer containing a prescribed amount of propionic acid.

(8) Conventional Amounts of Acetic Acid and Propionic Acid

It is well known that a very small amount of acetic acid and propionic acid are contained in acrylic acid obtained by vapor-phase oxidation of propylene, and in Examples 1 to 4 of the above-mentioned Patent Literature 20 (U.S. Pat. No. 6,444,744), acrylic acid containing 100 ppm of acetic acid or 100 ppm of propionic acid is produced and thereafter a water-absorbent resin is produced using the acrylic acid.

Further, it is known in the above-mentioned Patent Literature 19 (US Patent Application Publication No. 2005/0209411) that acetic acid and propionic acid in the acrylic acid are causes of malodor (acid smell) of a water-absorbent resin and in the opened US patent application, a water-absorbent resin with little malodor is provided by carrying out polymerization in presence of acetic acid and propionic acid in total of 400 ppm. In Comparative Example of the U.S. patent application, polymerization in presence of 1200 ppm of acetic acid and 300 ppm of propionic acid is disclosed. Also, Example in U.S. Pat. No. 6,710,141 describe polymerization of acrylic acid (no description of the amount) containing less than 2000 ppm of acetic acid and less than 600 ppm of propionic acid to obtain a water-absorbent resin. Further, Japanese Patent Application Publication, JP-A-8-34757 discloses a refining method of acrylic acid for decreasing acetic acid to 0.01 mass % or lower, regarding acetic acid, which is a cause of malodor of a water-absorbent resin.

In this application, with respect to acetic acid and propionic acid which are considered to cause a negative effect in the malodor issue and increase of which is regarded as a problem, it is found that existence of propionic acid in a prescribed amount exceeding a conventional amount (e.g. 300 ppm) is rather efficient to improve the water absorbency of the water-absorbent resin and the finding leads to completion of the invention.

In the present invention, it is found that as compared with propionic acid ($C_2H_5COOH$), acetic acid ($CH_3COOH$) is less or scarcely effective to improve the water absorbency (CRC) of the invention. Use of acetic acid is found to be a problem not only in the effect but also in the malodor since acetic acid has a low boiling point as compared with propionic acid. With respect to propionic acid and acetic acid determined to be harmful in the same way in Patent Literature 19, the present invention increases the water absorbency by using a prescribed amount or more of propionic acid and further improves acid smell by removal (particularly drying, more particularly drying by azeotropic dehydration) after polymerization or by adding a basic substance thereto.

Further, as a conventional problem (a problem to be solved by the invention), in order to carry out sufficient refining of acrylic acid for removal of acetic acid and propionic acid until the water-absorbent resin becomes free from malodor, it is conventionally needed to carry out highly advanced one-step or multi-step refining by distillation or crystallization since the boiling points and melting points and the structures of these acids are similar. Such highly advanced refining sacrifices the cost of the acrylic acid and yield and consequently also affects the cost of the water-absorbent resin. Such a problem is, as described above, more significant for the acrylic acid derived from a non-fossil raw material. However, the method of the present invention which requires no excess refining of the acrylic acid for removing acetic acid and propionic acid, uses a prescribed amount of propionic acid as it is for the water-absorbent resin, and removes the acids (particularly drying, more particularly drying by azeotropic dehydration) or adds a basic substance after polymerization is suitable for economically producing the water-absorbent resin. Consequently, even if the effect of the present invention to improve the water absorbency is low (or almost) scarcely caused), the production cost of the water-absorbent resin can be saved by carrying out no excess refining of the acrylic acid for removing acetic acid and propionic acid and using the acrylic acid containing a prescribed amount of propionic acid as it is for the water-absorbent resin.

(9) Acetic Acid

In the present invention, it is preferable to decrease residual acetic acid and propionic acid to 1 mass % or less in the water-absorbent resin due to the problem of malodor (acid smell) and it is preferable to evaporate or remove these acids by heating treatment as described below, particularly heat drying, and more particularly azeotropic dehydration. The propionic acid amount, further the total of acetic acid and propionic acid, in the obtained water-absorbent resin is controlled to 0.5 mass % or less, further 0.3 mass % or less, and furthermore 0.1 mass % or less in terms of the malodor. Acetic acid (boiling point 118° C.) with a low boiling point as compared with propionic acid (boiling point 141° C.) and of which the load in the evaporation step is low is preferable to be less in the raw material, accordingly, the monomer is preferable to contain less acetic acid than propionic acid or contain acetic acid to a ND level (Not Detected).

That is, not limited to conventional acrylic acid described in the description (6) of the above-mentioned Patent Literature 19 (US Patent Application Publication No. 2005/0209411) (acetic acid 1200 ppm and propionic acid 300 ppm), acrylic acid generally contains more acetic acid as compared with propionic acid. In the present invention using propionic acid to improve the water absorbency, it is no need to increase acetic acid, which is a cause of malodor, along with the increase of propionic acid, and the amount of acetic acid in the acrylic acid is preferably lower than that of propionic acid or ND (Not Detected).

The amount of acetic acid in the monomer or the acrylic acid is 1000 ppm or lower or less than that of propionic acid and more concretely, the amount of acetic acid is preferably 0 to 1000 ppm, more preferably 800 ppm or lower, and furthermore preferably 600 ppm or lower. It is also preferably less than 1 times by mass to that of propionic acid, more preferably in a range of 0.01 to 0.9 times by mass, and further more preferably in a range of 0.05 to 0.8 times by mass. Further, the mass (ppm) and the ratio of acetic acid are preferable to be satisfied both simultaneously.

(10) Polymerization Inhibitor

A polymerization initiator is preferably contained at the time of polymerization. Examples of the polymerization initiator are N-oxyl compounds, manganese compounds, and substituted phenol compounds exemplified in International Publication No. 2008/096713 and preferably substituted phenols and particularly methoxyphenols.

Preferably usable methoxy phenols are concretely o-, m-, and p-methoxyphenols, and methoxyphenols further having one or more substituent groups such as methyl, tert-butyl, hydroxyl, or the like and particularly preferable one in the present invention is p-methoxyphenol. The content of methoxyphenols may be 10 to 200 ppm, preferably 5 (further 10) to 160 ppm, more preferably 10 to 100 ppm, furthermore preferably 10 to 80 ppm, and even more preferably 10 to 70 ppm. In the case the content of p-methoxyphenol exceeds 200 ppm, a problem of coloring (yellowing/yellow discoloring) of the obtained water-absorbent resin is caused. Further, in the case the content of p-methoxyphenol is less than 10 ppm, particularly less than 5 ppm, that is, p-methoxyphenol, which is a polymerization inhibitor, is removed by refining by distillation or the like, not only there is a risk of occurrence of polymerization before starting of intentional polymerization but also, surprisingly, the polymerization speed is rather delayed and therefore, it is not preferable.

(11) Amount of Fe

The monomer in this application preferably contains iron and/or no iron. The amount of iron in the monomer (in terms of $Fe_2O_3$) is preferably 0 to 5 ppm or lower, more preferably 0 to 2 ppm or lower, further preferably 0 to 1 ppm or lower, particularly preferably 0 to 0.1 ppm or lower, and even more preferably 0.05 ppm or lower. In the case where the amount is excessively low, it is disadvantageous from an aspect of purification cost in relation to the effect and further, a small amount of iron is sometimes acceptable or preferable and, the amount of Fe in the monomer (in terms of $Fe_2O_3$) is, including the lower limit thereof, preferably 0.002 to 2 ppm, more preferably 0.01 to 1 ppm, and further preferably 0.02 to 0.5 ppm. If the content of iron is low, there is not only a risk of occurrence of polymerization before addition of a polymerization initiator but also a possibility of conversely delaying polymerization even if a polymerization initiator is added.

In the case where the amount of iron exceeds the above-mentioned range, the water-absorbent resin is colored or deteriorated and therefore, it is not preferable. In the case where the amount of iron is adjusted to ND (zero), it costs not only high but also no effect corresponding to the cost can be obtained. Rather, the polymerization rate may possibly be delayed in the case of Redox polymerization.

The Fe amount can be measured by an ICP emission spectroscopic analysis method described in, for example, JIS K1200-6. An ICP emission spectroscopic analyzer is commercialized as ULTIMA, or the like, manufactured by HORIBA Ltd. As Fe to be used in the present invention, Fe ion may be used; however, trivalent iron, particularly $Fe_2O_3$, is preferable in terms of the effect. Such a control can be conducted by controlling the purity of the alkali metal salt to be used for the neutralization, or by removal with an ion exchange resin.

(12) Use of a Plurality of Acrylic Acids

In the present invention, to simply and economically obtain a monomer or acrylic acid containing a prescribed trace component (particularly, propionic acid), it is preferable to produce the monomer by mixing a plurality of acrylic acids (hereinafter referred to a plurality of acrylic acids) with different propionic acid amounts or by different production methods. The object trace component in the present invention may include, preferably an organic compound, particularly preferably a saturated organic carboxylic acid, and furthermore preferably propionic acid. A plurality of acrylic acids are the concept including acrylic acid salts, and mixing of the acrylic acids may be carried out by mixing a plurality of acrylic acids before neutralization and carrying out neutralization further as required, or mixing a plurality of the acrylic acid salts after neutralization from a plurality of acrylic acids, or making one/some acrylic acid(s) be an acrylic acid salt by neutralization and mixing another/the others acrylic acid(s) as it is/are un-neutralized. That is, to prepare acrylic acid containing propionic acid just in an amount as aimed, it is difficult in terms of the productivity of the acrylic acid and the cost further, in the case the acrylic acid containing an aimed amount of propionic acid itself is not produced (e.g.; one/some acrylic acid(s) contain(s) an excess amount of propionic acid and another/the others contain(s) an insufficient amount), as a preferable production method, a plurality of acrylic acids may be prepared to obtain the acrylic acid or the monomer containing an aimed amount of propionic acid.

In this case, at least acrylic acid derived from a non-fossil raw material is used and a plurality of acrylic acids are used and one or some of the acrylic acids is/are obtained from a non-fossil raw material and another or the others is/are obtained from a fossil raw material (FIG. 2). In general, the acrylic acid derived from a non-fossil raw material contains much propionic acid or the like and therefore, it is used preferably. Further, in terms of also adjustment or stabilization of other trace components, not limited to propionic acid (even if propionic acid is in the same level), a plurality of acrylic acids, particularly the acrylic acid from a fossil raw material and the acrylic acid from a non-fossil raw material, are used in combination. As another effect of the invention, use of a plurality of raw material sources of a fossil raw material and a non-fossil raw material for acrylic acids lowers the raw material cost of the water-absorbent resin, and the water-absorbent resin which is optimum from an aspect including the raw materials cost aspect can be obtained. That is, preferably, the acrylic acid derived from a fossil raw material and the acrylic acid derived from a non-fossil raw material are used in combination as described below.

Further, in the case the trace components (preferably an organic compound, particularly preferably a saturated organic carboxylic acid, and furthermore preferably propionic acid) are in amounts below prescribed amounts or aimed amounts or in excess amounts, other different trace components (particularly propionic acid amount) or the acrylic acid produced by a different production method may be properly mixed to give a prescribed amount of the monomer. Since it is often difficult to obtain acrylic acid satisfying propionic acid or the trace components in aimed amounts in terms of the refining cost and production amount, it is preferable that the above-mentioned different acrylic acids are mixed to give the acrylic acid with prescribed amounts of the trace components (e.g. propionic acid) or a water-soluble monomer of the water-absorbent resin using the acrylic acid.

Hereinafter, propionic acid suitable as a trace component is representatively described; however it is preferable to prepare a monomer containing a prescribed amount of propionic acid by using a plurality of acrylic acids containing different amounts of propionic acids from aspects of cost and process in order to adjust the amount of propionic acid in the acrylic acid. That is, a plurality of acrylic acids containing different amounts of propionic acids are produced in different processes of manufacturing acrylic acid (FIGS. 3, 4, and 5).

Herein, with respect to acrylic acids containing different amounts of propionic acid, one acrylic acid contains propionic acid preferably 1.01 to 1000 times by mass with respect to another acrylic acid does, more preferably 1.05 to 100 times by mass, and furthermore preferably 1.1 to 50 times by mass. Concretely, at least one acrylic acid is preferable to contain 400 ppm or more of propionic acid.

Further, different acrylic acids production processes mean completely different plants and installation sites or different in raw materials, the oxide type (particularly catalysts), refining type (distillation and crystallization) and among them, preferably impurities, particularly propionic acid amounts are made to be different. In the case two kinds of acrylic acids with different purities (impurity amounts) are used, the use ratio (mass ratio) may be determined properly and it is generally in a range of 1:99 to 99:1. It is preferably 10:90 to 90:10, more preferably 20:80 to 80:20, and even more preferably 30:70 to 70:30. In addition, acrylic acid other than the two types may be used in an amount in a range of 0 to 50 mass % in the total acrylic acids, more preferably 0 to 30 mass %, and even more preferably 0 to 10 mass %. The use ratio of two different types or more of acrylic acids may be determined properly on the basis of the costs (raw material costs) of both acrylic acids, supply amounts, trace components (propionic acid and other trace components), etc. and particularly, use of a plurality (particularly two types) of a fossil raw material and a non-fossil raw material can save the raw material cost of the water-absorbent resin. In the case the fossil raw material and the non-fossil raw material are used in combination, the ratio can be measured by quantitatively measuring 14C in the monomer and in the water-absorbent resin.

The effect of propionic acid can be caused at the time of polymerization of the monomer; however even if propionic acid is added to the water-absorbent resin after polymerization, not only the effect of improving the water absorbency cannot be observed but also a problem of malodor is caused. Further, in the case propionic acid and acetic acid is too much, it is difficult to remove them after polymerization or during polymerization and particularly difficult to remove them during drying and a problem of malodor due to residual may be caused in some cases and it is preferable to use propionic acid and acetic acid in the above-mentioned ranges from a viewpoint of the balance with malodor.

One or both of acrylic acids to be mixed preferably contain organic or inorganic (particularly organic) trace components such as propionic acid etc. in an amount of 5 mass % or lower, more preferably 2 mass % or lower, further preferably 1 mass % or lower, particularly preferably 0.5 mass % or lower, still further preferably 0.2 mass % or lower, and even more preferably 0.1 mass % or lower. The amounts of the trace components are preferably different from one another. The lower limit of the trace amounts is 0.0001 mass % and further about 0.001 mass % and mixing of a plurality of acrylic acids leads to an advantage of use of acrylic acids without excess purification. Particularly, in the case of acrylic acid derived from a non-fossil raw material, the amount of propionic acid is sometimes excess beyond the objective amount and excess purification is not needed by the method of the present invention.

Acrylic acids with different propionic acid amounts or produced by different production methods may be mixed by continuous mixing using a pipeline or by mixing in a tank. For example, acrylic acid containing a comparatively large amount of propionic acid can be obtained by employing, as a refining method, distillation rather than crystallization or can be derived from a non-fossil raw material rather than a fossil raw material and it is preferable to mix these acrylic acids for obtaining prescribed acrylic acid or monomer. Further, production processes of a plurality of acrylic acids and production processes of the water-absorbent resin may be carried out in the same site or in different sites or by different manufacturers. In the case of different sites or different manufacturers, the acrylic acids may be purchased or transported properly.

Particularly, the content of propionic acid can be changed easily by changing especially the raw material. In such a method, in terms of adjustment of the trace components and risk hedge of raw materials, one or some of a plurality of acrylic acids containing different amounts of propionic acid can be obtained from a non-fossil raw material (raw material derived from a natural substance) and another or others is/are obtained from a fossil raw material. In that case, acrylic acid from a fossil raw material and acrylic acid from a non-fossil raw material are used together in the above ratio.

The mixing ratio in the above-mentioned production process may be constant or changed over time and/or the water-absorbent resin. In the above-mentioned production process using a plurality of acrylic acids, since the purity of the monomer (trace components) can be controlled to be constant with no need of excess refining of acrylic acids, the acrylic acids can be used economically and at high yield and the water-absorbent resin with high physical properties can be economically and stably obtained. At that time, a plurality of acrylic acids to be mixed may be properly measured and particularly, the above-mentioned trace components (e.g., the above-mentioned description (11), Fe amount, acetic acid, propionic acid, etc.) are measured to determine the optimum mixing ratio.

(13) Manufacturing Method of Other Acrylic Acids to be Used in Combination

In the present state where a water-absorbent resin is consumed in large quantities in diapers etc., and is disposed, the raw material is preferable to be renewable and sustainable; that is, it is preferable to obtain a water-absorbent resin and its raw material from a non-fossil raw material. As a method of manufacturing such a water-absorbent resin and acrylic acid, acrylic acid may be obtained from glycerin obtained from fats and oils and thereafter, a water-absorbent resin may be obtained.

Additionally, methods of manufacturing such a water-absorbent acrylic acid resin from a non-fossil raw material are exemplified in the above description, and besides, for example, International Publication No. 2006/092271, International Publication No. 2006/092272, International Publication No. 2006/136336, International Publication No. 2008/023039, International Publication No. 2008/023040, International Publication No. 2007/109128, etc. These six Patent Documents do not at all imply the method of manufacturing a water-absorbent resin of the present invention. For example, International Publication No. 2006/092271 and International Publication No. 2008/023039 disclose techniques of manufacturing water-absorbent resins by obtaining acrylic acid from hydroxypropionic acid; however problems of residual hydroxypropionic acid and propionic acid in monomers are not disclosed.

Also, methods of manufacturing acrylic acid from a non-fossil raw material are exemplified in International Publication No. 2006/08024, US Patent Application Publication No. 2007/0129570, and International Publication No. 2007/119528, International Publication No. 2007/132926, etc. International Publication No. 2006/08024 discloses the fact that propanal is produced as a byproduct at the time of obtaining acrolein from glycerin. The acrylic acid containing propionic acid of the present invention, particularly, acrylic acid derived from a non-fossil raw material can be obtained easily by oxidizing the acrolein containing propanal.

That is, from the viewpoints of renewability and sustainability and also of controllability of phenol, preferably, acrylic acid is obtained from a raw material of a natural substance (non-fossil raw material) and more preferably, acrylic acid is obtained from glycerin as the natural substance.

Conventionally, it has been found that the acrylic acid from a non-fossil raw material, particularly acrylic acid obtained from hydroxypropionic acid or glycerin, contains a large amount of acetic acid and propionic acid. The purification of the acrylic acid from a non-fossil raw material for removing acetic acid and propionic acid sacrifices cost and yield; however, the method of the present invention using a prescribed amount of propionic acid as it is for a water-absorbent resin without carrying out excess purification of the acrylic acid from a non-fossil raw material for removing acetic acid and propionic acid, and then carrying out the removal (particularly drying, more particularly drying by azeotropic dehydration) after polymerization or addition of a basic substance can manufacture an inexpensively renewable and sustainable water-absorbent resin.

(14) Phenol

In the present invention, it is found that phenol is effective for improvement of early-phase coloring of the water-absorbent resin.

That is, in the present invention, the monomer contains phenol (rational formula: $C_6H_5OH$). The content of phenol is preferably 0.01 to 5000 ppm, more preferably 0.01 to 2500 ppm, and even more preferably 0.01 to 400 ppm in the monomer (solid matter).

In addition, methoxyphenol exemplified in International Publication No. 2003/051940 and sterically hindered phenol exemplified in International Publication No. 2003/53482 can be used as a polymerization inhibitor for acrylic acid and increase of methoxyphenol or the like causes coloring of the water-absorbent resin, whereas phenol is used in this application to prevent the coloring.

Since solubility of phenol in water is slightly low (8.4 g/100 ml, 20° C.), it is preferable to previously add a prescribed amount of phenol in acrylic acid with high solubility. The increase of phenol exhibits the effect on early-phase coloring and also provides antibacterial and deodorization properties in some cases; however use in a large amount may lower the effect of preventing coloring over time.

Use of phenol gives the water-absorbent resin with a white color even in disadvantageous conditions for coloring like the cases of carrying out high density polymerization, high temperature initiation polymerization, high temperature drying, high temperature surface-crosslinking, etc., without any problem of deterioration of physical properties of the water-absorbent resin and decrease of the stability of the monomer (gelatification or partial gelatification to occur prior to the polymerization causes clogging of a pipe or a tank).

To add a prescribed amount of phenol to the acrylic acid, phenol may be added to sufficiently refined acrylic acid or phenol is produced as a by-product in the middle step of producing acrylic acid and thereafter phenol is oxidized (oxygen-oxidized) or removed by separation-removal to adjust the amount to be a prescribed amount. A method for producing the phenol-containing acrylic acid means the acrylic acid derived from the above-mentioned raw material derived from as a natural substance, more preferably derived from glycerin as the natural substance. A sustainable and renewable polyacrylic acid-based water-absorbent resin derived from natural glycerin can be produced from such acrylic acid.

(15) Hydroxyacetone

In the present invention, it is found that hydroxyacetone causes a negative effect on coloring of the water-absorbent resin over time and also causes a negative effect on the stability of the monomer.

That is, the amount of hydroxyacetone ($CH_3COCH_2OH$: also known as acetol) as an impurity is preferably 0 to 300 ppm in the acrylic acid of the present invention. The upper limit of hydroxyacetone is preferably 200 ppm, 100 ppm, 50 ppm, 20 ppm, 10 ppm, 5 ppm, 1 ppm, and 0.1 ppm in this order. In addition, existence in a prescribed amount tends to improve the early-phase coloring (particularly WB) and therefore, it is preferable.

Conventionally, if the polymerization initiating temperature or concentration is increased or polymerization scale is expanded for physical properties and productivity, or the polymerization inhibitor is decreased for preventing coloring, partial gelatinization of the monomer is caused; however, in the present invention, it is found that the cause thereof is because hydroxyacetone decreases the stability of the monomer. Additionally, hydroxyacetone tends to improve the early-phase coloring, it is preferable to contain hydroxyacetone in an amount of about 0.1 to 10 ppm in the monomer.

(16) Method of Controlling Phenol and Hydroxyacetone

Phenol (boiling point 182° C., melting point 43° C.) and hydroxyacetone (boiling point 146° C., melting point −6° C.) in acrylic acid (boiling, point 142° C., melting point 12° C.) are controlled by crystallization or distillation in the acrylic acid on the basis of differences of the boiling points, melting points, and solubility, or phenol and hydroxyacetone, which are trace components, may be controlled by addition in prescribed amounts or by oxidizing them with acrolein in the acrylic acid production process. For example, a method of International Publication No. 2008/05364 is preferably employed for the removal or control.

The control method disclosed in the patent (particularly, paragraphs [0015] to [0041]) is entirely incorporated in the present application. The production process of desirable acrylic acid from a natural substance is exemplified in the patent, and the method is a technique for removing phenol and hydroxyacetone from the acrylic acid but no technique for producing the water-absorbent resin in specified steps by adding prescribed amounts of phenol and hydroxyacetone is disclosed.

That is, as one example of a process for producing acrylic acid in addition to the patent, described is a process for producing acrylic acid involving a refining step of removing phenol and/or 1-hydroxyacetone from an acrolein-containing composition exemplified in the patent and an oxidation step of producing acrylic acid by oxidizing acrolein in the acrolein-containing composition after the refining step. Preferably, the process involves a dehydration step of producing acrolein by dehydrating glycerin before the refining step. Further preferably, glycerin is dehydrated in vapor phase in the dehydration step.

(17) Control Method of Hydroxypropionic Acid

Hydroxypropionic acid may be separated by distillation or the like based on the difference of boiling points of hydroxypropionic acid and acrylic acid and preferably subjected to crystallization.

The amount of hydroxypropionic acid in the monomer at the time of polymerization, particularly in the monomer after neutralization is preferably 2000 ppm or lower, more preferably 1000 ppm or lower, furthermore preferably 500 ppm or lower, moreover preferably 300 ppm or lower, and even more preferably 100 ppm or lower. Excess refining leads to increase of the cost and a small amount of the residual slightly causes a negative effect on the residual monomer and therefore, the lower limit is preferably 1 ppm and particularly sufficiently about 1.0 ppm.

To lower hydroxypropionic acid, it is preferable to lower hydroxypropionic acid in acrylic acid and at the same time to suppress conversion reaction to 3-hydroxypropionic acid by Michel addition to the acrylic acid during neutralization or after neutralization.

Therefore, acrylic acid to be used for neutralization is preferable to be in non-aqueous state (water content of 20 mass % or lower, more preferably 1 mass % or lower). In the neutralization step thereafter, after refining, particularly refining by distillation, the acrylic acid is used within a time as short as possible, for example, within 72 hours, preferably within 24 hours, more preferably within 12 hours, and even more preferably within 6 hours for the neutralization or preparation of a monomer. Further, in the neutralization step, the acrylic acid is put at least temporarily in the state that the neutralization ratio exceeds 100% by mole. Next, the monomer is prepared using the acrylic acid and the obtained acrylic acid salt and other monomers as required. Finally, the obtained monomer may be polymerized within, for example 24 hours, preferably within 12 hours, more preferably within 6 hours, and even more preferably within 2 hours after completion of the monomer preparation. Further, the acrylic acid after distillation refining is preferable to be kept at a temperature as low as possible, for example, 30° C. or lower, preferably from a solidifying point to 25° C. until the acrylic acid is used for the neutralization or preparation of the monomer. The neutralization step is preferably carried out at a low temperature, for example, 70° C. or lower and particularly 50° C. or lower within a short time, preferably within 4 hours in the presence of a polymerization inhibitor. In the case the acrylic acid is kept for a relatively long time after distillation, the acrylic acid is better to be kept in non-aqueous state. Further, the monomer on completion of the preparation should be preserved at its solidification point or higher to 40° C. or lower, preferably 0 to 30° C. If out of the conditions, 3-hydroxypropionic acid and residual monomer tend to be increased and therefore, it should be careful.

In International Publication No. 2008/023039, a technique for obtaining a water-absorbent resin after producing acrylic acid from 3-hydroxypropionic acid by dehydration and crystallization is disclosed and in this technique an aqueous solution of 62 mass % of refined acrylic acid after crystallization is obtained; however there is no description of neutralization temperature or time and therefore, increase of 3-hydroxypropionic acid in the neutralized monomer cannot be controlled. In the present invention, the refined acrylic acid is dehydrated, and further the time and temperature until neutralization and the time after neutralization are controlled to inevitably suppress 3-hydroxypropionic acid in the monomer to 2000 ppm or lower at the time of polymerization.

(18) Concentration of Monomer

Monomers may be polymerized generally in an aqueous solution. The monomer concentration in the aqueous solution is generally 10 to 90 mass %, preferably 20 to 80 mass %, more preferably 30 to 70 mass %, and even more preferably 40 to 60 mass %. Further, when the monomer is polymerized in an aqueous solution, a surfactant, a polyacrylic acid (salt), and a polymer compound such as starch and polyvinyl alcohol, various kinds of chelating agents, various kinds of additives may be added and used in combination in an amount of 0 to 30 mass % (to the monomer).

(19) Other Monomer Components

Further, the aqueous monomer solution may contain a water-soluble resin or a water-absorbent resin such as starch, polyacrylic acid (salt), polyethyleneimine or the like in an amount of, for example 0 to 50 mass %, preferably 0 to 20 mass %, furthermore preferably 0 to 10 mass %, and even more preferably 0 to 3 mass % to the monomer. Various kinds of foaming agents (carbonates, azo compounds, foams, etc.), surfactants, and additives described below may be added in an amount of, for example 0 to 5 mass % and preferably 0 to 1 mass % to improve the various physical properties of the water-absorbent resin and a granular water-absorbent agent.

The water-absorbent resin may contain a chelating agent, hydroxycarboxylic acid such as lactic acid, and a reducing inorganic salt in an amount of preferably 10 to 5000 ppm, more preferably 10 to 1000 ppm, furthermore preferably 50 to 1000 ppm, and even more preferably 100 to 1000 ppm. It is dispensable to use preferably a chelating agent.

Hereinafter, a chelating agent, a hydroxycarboxylic acid, and a reducing inorganic salt usable are described in (20) to (22).

(20) Chelating Agent (Preferably Water-Soluble Organic Chelating Agent)

In case the aim of the present invention is to further improve, for example, color stability (the color stability in the case of storing the granular water-absorbent agent in high temperature and high humidity condition for a long duration) and the anti-urine property (prevention of gel deterioration) of the granular water-absorbent agent of the present invention (the final product obtained from the water-absorbent resin), a chelating agent is preferably used.

In terms of the effect, the chelating agent is preferably a water-soluble organic chelating agent and more preferably a non-polymeric compound organic chelating agent having nitrogen atom or phosphorus atom and more preferably an aminopolycarboxylic acid type chelating agent or an aminopolyphosphoric acid type chelating agent. Due to the effect on the polymerization and physical properties to be obtained, a non-polymeric organic compound with a weight average molecular weight of 5000 or lower is preferable and the molecular weight is more preferably 100 to 1000.

Among the above-mentioned compounds, compounds having nitrogen atom or phosphorus atom are preferable. Especially, amino-polycarboxylic acids (salts) having two or three or more of carboxyl groups in the molecule or organic phosphoric acid (salt) compounds having phosphoric acid groups are preferable. The number of carboxyl groups is preferably 3 to 100, more preferably 3 to 20, and particularly preferably 3 to 10. Particularly, organic polyphosphoric acid compounds or amino-polyphosphoric compounds having amino groups are preferable.

Examples of the aminopolycarboxylic acids (salts) having two or more carboxyl groups are aminocarboxylic acid type metal chelating agents such as iminodiacetic acid, hydroxyethyliminodiacetic acid, nitrilotriacetic acid, nitrilotripropionic acid, ethylenediamine tetraacetic acid, hydroxyethylenediamine triacetic acid, hexamethylenediamine tetraacetic acid, diethylenetriamine pentaacetic acid, triethylenetetramine hexaacetic acid, and their salts.

Examples of the organic polyphosphoric acid compounds or aminopolyphosphoric acid compounds having three or more phosphoric acid groups in a molecule are ethylenediamine-N,N'-di(methylenephosphinic acid), ethylenediamine tetra(methylenephosphinic acid), polymethylenediamine tetra(methylenephosphonic acid), diethylenetriamine penta(methylenephosphonic acid), 1-hydroxyethylidene diphosphonic acid, and their salts.

(21) Hydroxycarboxylic Acid Compound (Hydroxypolycarboxylic Acid)

Further, for the color stability effect, hydroxycarboxylic acids such as citric acid (salt), malic acid (salt), etc., and particularly non-polymeric hydroxycarboxylic acids, non-polymeric hydroxypolycarboxylic acids, etc. exemplified in International Publication No. 2008/026772 may be used in form of monomers or their polymers.

(22) Reducing Inorganic Salt

Further, for the color stability effect and anti-urine property, the reducing inorganic salts exemplified in US Patent Application Publication No. 2006/88115 may be used.

(23) Polymerization Step (Crosslinking Polymerization Step)

In terms of the capability and easiness of polymerization control, a polymerization method is generally carried out by aqueous solution polymerization or reversed phase suspension polymerization, particularly, the aqueous solution polymerization and further preferably continuous aqueous solution polymerization, which are conventionally difficult to control polymerization or improve the coloring. An especially preferable method is a continuous polymerization method for producing the water-absorbent resin in a huge scale of 0.5 t/hr or higher, further 1 t/hr or higher, furthermore 5 t/hr or higher, and still further 10 t/hr or higher by polymerization of an aqueous monomer solution in one line. Consequently, the preferable continuous polymerization may include methods described as continuous kneader polymerization (e.g. U.S. Pat. Nos. 6,987,151 and 670141), continuous belt polymerization (e.g. U.S. Pat. Nos. 4,893,999, 6,241,928, and US Patent Application Publication No. 2005/215734).

In addition, in the continuous polymerization, polymerization at a high temperature starting (monomer at 30° C. or higher, 35° C. or higher, further 40° C. or higher, and particularly 50° C. or higher: the upper limit is the boiling point) in a high monomer concentration (30 mass % or higher, 35 mass % or higher, further 40 mass % or higher, and particularly 45 mass % or higher: the upper limit is the saturated concentration) can be exemplified as one preferable example. The highest temperature for the polymerization is preferably 100 to 150° C. and more preferably 105 to 130° C. from the physical aspect. The unsaturated carboxylic acid (propionic acid) described below can be more efficiently removed during the polymerization or after polymerization by such high temperature polymerization or high concentration polymerization and it is preferable also from a viewpoint of decrease of malodor (acid smell) of the water-absorbent resin to be obtained.

The monomer stability is excellent in the present invention and the water-absorbent resin with white color can be obtained even by the polymerization in such a high concentration and at such a high temperature and therefore, it is easy to remove propionic acid and thus the effect is significantly exhibited in such conditions. Preferable examples of high temperature initiating polymerization are described in U.S. Pat. Nos. 6,906,159 and 7,091,253 and in the present invention, the monomer stability before polymerization is excellent and therefore, production in an industrial scale is made easy.

The polymerization can be carried out in atmospheric air; however it is preferable for coloring improvement to carry out the polymerization in an inert gas atmosphere of nitrogen or argon (e.g., oxygen concentration of 1% by volume or lower) and also, the monomer is preferable to be used for polymerization after the dissolved oxygen in the solution containing the monomer is sufficiently replaced with an inert gas (e.g., less than 1 ppm of oxygen). Even if such degassing is carried out, the monomer is excellent in the stability and therefore gelatinization before the polymerization does not occur and the water-absorbent resin with higher physical properties and high whiteness can be obtained.

(24) Polymerization Initiator

A polymerization initiator to be used for the present invention can be selected properly in accordance with the polymerization mode. Examples of the polymerization initiator may include a photodecomposition type polymerization initiator, a heat decomposition type polymerization initiator, and a redox type polymerization initiator. The amount of the polymerization initiator may be 0.0001 to 1% by mole and preferably 0.001 to 0.5% by mole to the monomer.

An increase of the polymerization initiator may possibly cause coloration and in the case where the amount is low, it results in an increase of residual monomer. Further, in the case of a conventional coloring improver, it sometimes causes an adverse effect on polymerization; however, in polymerization by the method of the invention, the coloration can be improved without causing any adverse effect on polymerization (conventional time and various physical properties) and therefore, it is preferable.

Examples of the photodecomposition type polymerization initiator may include benzoin derivatives, benzyl derivatives, acetophenone derivatives, benzophenone derivatives, and azo compounds. Examples of the heat decomposition type polymerization initiator may include persulfuric acid salts (sodium persulfate, potassium persulfate, and ammonium persulfate), peroxides (hydrogen peroxide, tert-butyl peroxide, methyl ethyl ketone peroxide), azo compounds (2,2'-azobis(2-amindinopropane) dihydrochloride, 2,2'-azobis[2-(2-imidazolin-2-yl)propane]dihydrochloride, etc.).

Examples of the redox type polymerization initiator may include combination systems of the above-mentioned persulfuric acid salts and peroxides in combination with reducing compounds such as L-ascorbic acid and sodium hydrogen sulfite. Further, combination use of a photodecomposition type initiator and a heat decomposition type polymerization initiator can also be exemplified as a preferable embodiment.

(25) Gel Crushing Step

The hydrogel type crosslinked polymer obtained by the polymerization may be dried directly; however, it may be gel-crushed to be granular by a crusher (a kneader, a meat chopper, etc.) during the polymerization or after the polymerization, as required.

From the physical property aspect, regarding the temperature of the hydrogel at the time of gel crushing, the hydrogen is kept or heated preferably at 40 to 95° C. and more preferably 50 to 80° C. The resin solid matter of the hydrogel is not particularly limited; however, from the physical property aspect, it is preferably 10 to 70 mass %, more preferably 15 to 65 mass %, and even more preferably 30 to 55 mass %. It is optional to add water, a polyalcohol, a mixed liquid of water and a polyalcohol, a solution obtained by dissolving a polyvalent metal in water, or their vapor, or the like.

(26) Drying Step

In order to lower the residual monomer and prevent gel deterioration (anti-urine property) and yellowing in the polymerization initiator, a time span between the polymerization and a drying step via the gel crushing step carried out as required is short. That is, the drying step of the hydrogel type crosslinked polymer is started (loaded to a dryer) preferably within 1 hour, more preferably within 0.5 hours, and even more preferably within 0.1 hours. Further, to decrease the residual monomer and accomplish low coloring, the temperature of the hydrogel type crosslinked polymer from completion of the polymerization to starting of the drying is controlled preferably at 50 to 80° C. and more preferably at 60 to 70° C.

The drying step provides a dried product having a resin content in amount, which is calculated from a drying loss of the polymer (drying of 1 g powder or particles at 180° C. for 3 hours) in an amount controlled to be preferably 80 mass % or higher, more preferably 85 to 99 mass %, furthermore preferably 90 to 98 mass %, and even more preferably 92 to 97 mass %. The drying temperature is not particularly limited; however it is preferably in a range of 100 to 300° C. and more preferably in a range of 150 to 250° C. To satisfy both of the high physical properties and whiteness, it is most preferably that the drying temperature is 165 to 230° C. and the drying time is within 50 minutes. If the temperature or the time is out of the above-mentioned range, it may possibly result in decrease of the water absorbency (CRC), increase of soluble matters (Extractables), and deterioration of whiteness index.

A drying method may be a continuous or batch type method and one or more of various methods such as heat drying, hot-air drying, vacuum drying, infrared drying, microwave drying, drying by a drum drier, azeotropic dehydration with a hydrophobic organic solvent, high humidity drying using high temperature steam, and so forth can be employed and it is preferably hot-air drying with a gas with a dew point of preferably 40 to 100° C. and more preferably 50 to 90° C. A variety of band dryers can be preferably employed for the hot-air drying. Further, another preferable drying methods other than the hot-air drying may be azeotropic dehydration in a hydrophobic organic solvent described below since it can be carried out at a low temperature and has high removal efficiency of propionic acid. That is, from a viewpoint of removal of the saturated organic carboxylic acid described below, hot-air drying or azeotropic dehydration is preferable and azeotropic dehydration is more preferable.

(27) Removal of Organic Acid Such as Saturated Organic Carboxylic Acids (Propionic Acid and Acetic Acid) FROM WATER-ABSORBENT RESIN In the present invention, a saturated organic acid such as propionic acid, acetic acid, etc. may be present at the time of polymerization; however the acid may possibly become a cause of acid smell, etc., after polymerization. Further, saturated organic carboxylic acids such as acetic acid and propionic acid have a chemical structure and a boiling point similar to those of acrylic acid, separation purification by crystallization or distillation is difficult and it is accompanied with problems of an increase of manufacturing cost and decrease of yield of acrylic acid. Therefore, utilizing that a saturated organic carboxylic acid is not polymerized, the saturated organic carboxylic acid is preferably removed from the polyacrylic acid (salt) during polymerization or after polymerization, particularly after polymerization.

In the above-mentioned production process involving removal of propionic acid after polymerization, no excess refining is needed for acrylic acid and therefore, economical raw material acrylic acid can be used and consequently, the water-absorbent resin with high physical properties and free from malodor can be obtained economically and stably.

Accordingly, propionic acid at the time of polymerization may be removed from the water-absorbent resin during the polymerization (particularly the latter half of the polymerization and more particularly at 90% or more of the polymerization degree) or after the polymerization as required and, for example, 5 mass % or higher, preferably 15 mass % or higher, more preferably 30 mass % or higher, furthermore preferably 40 mass % or higher, moreover preferably 50 mass % or higher, and even more preferably 70 mass % or higher of the saturated aliphatic carboxylic acid (particularly, propionic acid to be used) contained in acrylic acid is removed. The saturated organic carboxylic acid amount in the water-absorbent resin obtained in such a manner, particularly the total of acetic acid and propionic acid, and more particularly the propionic acid amount is preferably 2 mass % or lower, more preferably 2000 ppm or lower, furthermore preferably 1500 ppm or lower, and even more preferably 1000 ppm or lower in terms of malodor. A small amount of the residue may not cause any malodor problem or propionic acid may exhibit an antibacterial property in some cases and thus in terms of the removal cost, the lower limit of propionic acid is sufficiently about 10 ppm and further about 100 ppm. In terms of malodor of the water-absorbent resin, the residual propionic acid is preferably a salt type (propionic acid salt, and particularly monovalent salt) rather than an acid type and consequently, the water-absorbent resin can be neutralized to an extent of the above-mentioned neutralization ratio and preferably to a prescribed ratio or higher.

A removal method may be extraction, washing, and evaporation, and preferably evaporation, and may be heating at a temperature equal to or higher than the boiling temperature (141° C.) in normal pressure or reduced pressure. A heating method may include a drying step or a surface crosslinking step and particularly preferably heating for a prescribed duration and at a prescribed temperature or higher in hydrated state. Further, at the time of removal of propionic acid, it is also preferable to remove, particularly evaporate, an organic acid such as acetic acid, acrylic acid, etc. in an amount within the above-mentioned range. Moreover, various kinds, e.g. water and hydrophilic and hydrophobic organic solvents, may be used for extraction and washing. Even more, in the case of azeotropic dehydration in the hydrophobic organic solvent described below, the saturated organic carboxylic acid, particularly propionic acid, can be efficiently removed even by heating at a temperature lower than the boiling point of propionic acid and thus it is preferable.

The heating conditions may be adjusted on the basis of heating time in the above-mentioned drying step or surface crosslinking, and the heating may be carried out preferably at 150 to 250° C., more preferably at 165 to 230° C. for 10 minutes or longer. It is more preferably 15 minutes to 2 hours and even more preferably 20 minutes to 1 hour. If the heating is carried out in the above-mentioned conditions, hydrogel with a water content of preferably 3 to 80 mass % and particularly preferably 5 to 70 mass % can be obtained. The heating treatment of the hydrogel is preferably hot-air drying in an air volume of hot air volume of 0.1 to 5 m/sec, more preferably 0.5 to 3 m/sec in a range of the above-mentioned dew point, that is, the dew point of hot air preferably in a range of 40 to 100° C. and more preferably in a range of 50 to 90° C. The azeotropic dehydration in the hydrophobic organic solvent, which is another suitable drying means, will be described below.

In the case neither water nor air blow is available, removal of propionic acid may be insufficient even by heating, and the obtained water-absorbent resin may sometimes emit acid smell. In the case of a low dew point also, the removal tends to be insufficient.

Further, it is found that azeotropic dehydration in a hydrophobic organic solvent is preferable for removal of propionic acid after polymerization. A preferable removal method to be applied may be azeotropic dehydration which is employed for drying in a reversed phase suspension polymerization. Further, the present invention can be suitably applicable for reversed phase suspension polymerization. That is, in the process for producing a water-absorbent resin, the present invention provides a process for producing a water-absorbent resin characterized in that the above-mentioned water-soluble unsaturated monomer contains a prescribed amount of propionic acid and the propionic acid is removed by azeotropic dehydration, and as the polymerization method at that time, aqueous solution polymerization or reversed phase suspension polymerization, preferably reversed phase suspension polymerization is employed. A hydrophobic organic solvent to be employed is generally a low boiling point hydrophobic organic solvent with a boiling point of about 60 to 140° C. and further 80 to 120° C. and in the present invention, it is found that propionic acid can be extremely efficiently removed by polymerization in a solvent with a low boiling point, particularly a solvent with a boiling point lower than the boiling point (141° C.) of propionic acid or by azeotropic dehydration (the upper limit of heating temperature is boiling point of the solvent).

The reversed phase suspension polymerization is a polymerization method involving suspending the aqueous monomer solution in granular state with a mass average particle diameter of 0.1 to 1 mm in a hydrophobic organic solvent and is advantageous to obtain gel particles with a product particle diameter simultaneously with polymerization and the polymerization is described in, for example, US patents such as U.S. Pat. Nos. 4,093,776, 4,367,323, 4,446,261, 4,683,274, 5,244,735, and other. In the present invention, a dispersant selected from surfactants and protection colloids may be dissolved or dispersed in the aqueous solution of the monomer, as required. In the case particularly, the reversed phase suspension polymerization is employed in the present invention, addition of the dispersant to the aqueous monomer solution gives the finally obtained water-absorbent resin in a narrowed particle diameter distribution since the monomer or the granular state polymer is dispersed more evenly in the hydrophobic organic solvent.

Examples of the surfactants may be (polyoxyethylene) phosphoric acid esters such as polyoxyethylene octyl phenyl ether phosphoric acid ester and polyoxyethylene tridecyl ether phosphoric acid ester (both produced by Dai-Ichi Kogyo Seiyaku Co., Ltd.: Plysurf (registered trade name)); nonionic type surfactants such as polyoxyethylene alkyl ethers, polyoxyethylene alkyl phenol ethers, polyoxyethylene alkyl esters, sorbitan fatty acid esters, polyoxyethylene sorbitan fatty acid esters, sucrose fatty acid esters, etc.; and anionic surfactants such as higher alcohol sulfuric acid esters, alkylnaphthalenesulfonic acid salts, alkyl polyoxyethylene sulfate salts, dialkylsulfosuccinic acid, and one or more surfactants among them may be separately selected and used and the surfactants may be added collectively or dividedly to the polymerization system. Further, examples of the polymer protection colloids may include ethyl cellulose, ethyl hydroxy cellulose, maleic acid (anhydride)-ethylene copolymers, maleic acid (anhydride)-butadiene copolymers, etc. Especially, fatty acid ester type surfactants, further nonionic type surfactants or anionic surfactants with HLB of 8 or higher, are preferable. The use amount of the surfactant or dispersant is generally 0.05 to 10 mass % and preferably 0.5 to 5 mass % to the monomer.

The hydrophobic organic solvent to be used as a medium for the reversed phase suspension polymerization in the present invention is not particularly limited if it is not mixed with the aqueous monomer solution and forms two phases and may include, for example, aliphatic hydrocarbons such as n-pentane, n-hexane, n-heptane, n-octane, etc.; alicyclic hydrocarbons optionally having substituent groups such as cyclohexane, cyclooctane, methylcyclohexane, decalin, etc.; aromatic hydrocarbons optionally having substituent groups such as benzene, ethylbenzene, toluene, xylene, etc., and one of these compounds or a mixture of two or more of these compounds may be used. Particularly preferable one is n-hexane (boiling point 69° C.), n-heptane (boiling point 98° C.), cyclohexane (boiling point 81° C.), methylcyclohexane (boiling point 110° C.), toluene (boiling point 81° C.), or xylene (boiling point 139° C.). The mass ratio of the hydrophobic organic solvent and the aqueous monomer solution is preferably 3:2 to 4:1. The dispersant or the hydrophobic organic solvent may be added separately during the polymerization or after polymerization.

The monomer is collectively or dividedly dispersed in the solvent and the solvent in which the monomer or its polymer is dispersed may be heated in a range of 40 to 90° C. and more preferably 50 to 80° C. for a duration in a range of 0.5 to 10 hours and more preferably 1 to 5 hours to carry out polymerization. The mass average particle diameter at the time of dispersion is generally in a range of 10 to 2000 μm and preferably in a range of 100 to 1000 μm in terms of physical properties, and more preferably in a range of 200 to 600 μm, and the contents of fine powders with 850 μm or larger and with 150 μm or smaller are preferably lower, and more concretely, 10 mass % or lower and 5 mass % or lower for the respective powders. They may be properly adjusted by types and amounts of the dispersant and solvent, the agitation power, and granulation.

The polymerization can be moderately controlled by carrying out the reversed phase suspension polymerization in the present invention. Further, as a significant advantage of the reversed phase suspension polymerization, as compared with common hot-air drying, in the case of employing drying at a low temperature (the upper limit of heating is boiling point of the solvent) by azeotropic dehydration in the hydrophobic organic solvent, removal of propionic acid after polymerization is easy in spite of low temperature drying (drying in the low boiling point organic solvent). Further, from a viewpoint of propionic acid removal, employment of aqueous solution polymerization and also employment of the above-mentioned azeotropic dehydration are preferable. In that case, the above-mentioned surfactant and dispersant are used as required, to disperse the hydrogel-containing polymer after the aqueous solution polymerization in the above-mentioned hydrophobic organic solvent, and then azeotropic dehydration is carried out in the hydrophobic organic solvent. The solid matter after the drying is within the above-mentioned range and the water-absorbent resin is separated from the hydrophobic solvent by filtration after the azeotropic dehydration and the hydrophobic organic solvent may be further dried out if necessary. Further, the hydrophobic organic solvent containing propionic acid and the surfactant may be distilled and recycled. Surface crosslinking is arbitrary and may be carried out in a dispersion system of the hydrophobic organic solvent or in a powder system after filtration.

Propionic acid removed in the various drying steps or surface-crosslinking step exemplified in (27) may be collected by cooling condensation or trapping with water or an aqueous alkaline solution in the form of an aqueous propionic acid (salt) solution together with other volatile compounds (e.g.; acrylic acid (boiling point 141° C.), acetic acid (boiling point 118° C.). The collected volatile compounds may be reused for polymerization after being purified if necessary or may be discarded by combustion or biodegradation.

The present invention provides a method of manufacturing a water-absorbent polyacrylic acid resin involving the steps of: preparing a monomer using acrylic acid, polymerizing the monomer, and drying the obtained hydrogel, wherein the acrylic acid obtained by dehydration ration of hydroxypropionic acid (salt) is used as the acrylic acid and polymerization is carried out with the content of the hydroxypropionic acid (salt) in the monomer being adjusted to 2000 ppm or lower. The present invention also provides a method of manufacturing a water-absorbent polyacrylic acid (salt) resin, involving polymerizing a monomer in conditions that the amount of a saturated aliphatic carboxylic acid in the monomer is adjusted to 5 mass % or lower, further to 2 mass % or lower, volatilizing at least a portion of the saturated aliphatic carboxylic acid in the drying step or thereafter, and further collecting the volatilized saturated aliphatic carboxylic acid if necessary. This manufacturing method is suitably applicable in the case where acrylic acid containing a large amount of saturated aliphatic carboxylic acid, particularly, acrylic acid obtained from a non-fossil raw material is used.

(28) Crushing or Classifying Step (Particle Size Adjustment After Drying)

After the step of drying the above-mentioned hydrogel-containing crosslinked polymer, the particle size may be adjusted after the drying if necessary, and the polymer is preferably made to have a specified particle size to improve the physical properties by surface crosslinking described below. The particle size can be adjusted properly by polymerization (particularly reversed phase suspension polymerization), crushing, classification, granulation, and fine powder recovery. Hereinafter, the particle size is a particle size defined by a standard sieve (JIS Z8801-1 (2000)).

The mass average particle diameter (D50) of the dried particles before surface crosslinking is adjusted to be 200 to 600 μm, preferably 200 to 550 μm, more preferably 250 to 500 μm, and even more preferably 350 to 450 μm. It is more preferable as the particles smaller than 150 μm are less, and the particles are adjusted in a range of generally 0 to 5 mass %, preferably 0 to 3 mass %, and more preferably 0 to 1 mass %. Further, it is more preferable as the particles bigger than 850 μm are less, and the particles are adjusted in a range of generally 0 to 5 mass %, preferably 0 to 3 mass %, and more preferably 0 to 1 mass %. The logarithmic standard deviation (σζ) of the particle size distribution is preferably 0.20 to 0.40, more preferably 0.27 to 0.37, and even more preferably 0.25 to 0.35. Its measurement method may be a method described in, for example, International Publication No. 2004/69915 and a method described in EDANA-ERT 420.2-02. The particle diameter is preferably applied also to the finally obtained water-absorbent resin after surface crosslinking.

In general if the particle size distribution is narrowed, that is, the upper and lower limits of the particle size are controlled to be narrow, the color becomes noticeable; however the present invention is free from such color issue and is preferable. Accordingly, in the present invention, it is preferable to carry out a classification step to give the ratio of particles with 150 to 850 μm of 95 mass % or more. More preferably, a classification step to give the ratio of 98 mass % or higher (upper limit 100 mass %) is included. Such particle size distribution is preferably applied also to the finally obtained water-absorbent resin after the surface crosslinking.

(29) Surface Crosslinking Step

In the present invention, the surface crosslinking step for the water-absorbent resin particles preferably after drying is further included. In the production process of the present invention, the water-absorbent resin with less coloring and less increase of residual monomers in the surface crosslinking step and more white and lower residual monomers can be obtained. Consequently, the surface crosslinking step is preferably employed for the water-absorbent resin to be subjected to surface crosslinking, particularly the water-absorbent resin to be subjected to high temperature surface crosslinking.

(Covalent Binding Surface Crosslinking Agent)

Examples of a surface crosslinking agent to be employed in the present invention may include various organic or inorganic crosslinking agents, and organic surface crosslinking agents are preferably used. Preferable examples to be used as the surface crosslinking agent are polyalcohol compounds, epoxy compounds, polyamine compounds and their condensation products with haloepoxy compounds, oxazoline compounds (mono-, di-, or poly-)oxazolidinone compounds, and alkylene carbonate compounds and dehydration esterification reactive crosslinking agents containing polyalcohol compounds, alkylene carbonate compounds, and oxazolidinone compounds, which require a particularly high temperature reaction, are usable.

More concretely, examples are compounds exemplified in U.S. Pat. Nos. 6,228,930, 6,071,976, and 6254990. Examples are polyalcohol compounds such as mono-, di-, tri-, or tetra-propylene glycol, 1,3-propanediol, glycerin, 1,4-butanediol, 1,3-butanediol, 1,5-pentanediol, 1,6-hexanediol, sorbitol, etc.; epoxy compounds such as ethylene glycol diglycidyl ether, glycidol, etc.; alkylene carbonate compounds such as ethylene carbonate; oxetane compounds; and cyclic urea compounds such as 2-imidazolidinone.

(Ion-Bonding Surface Crosslinking Agent)

Further, other than the above-mentioned organic surface crosslinking agent, an inorganic surface crosslinking agent may be used to improve the liquid permeability potential or the like. Examples usable as the inorganic surface crosslinking agent may include divalent or higher, preferably, trivalent to tetravalent polyvalent metal salts (organic salts and inorganic salts) and hydroxides. Polyvalent metals to be used are aluminum, zirconium, etc., and their salts are aluminum lactate and aluminum sulfate. These inorganic surface crosslinking agents may be used simultaneously with or separately from the organic surface crosslinking agent. The surface crosslinking with polyvalent metals is exemplified in International Publication Nos. 2007/121037, 2008/09843, and 2008/09842, in U.S. Pat. Nos. 7,157,141, 6,605,673, and 6620889, in US Patent Application Publication Nos. 2005/0288182, 2005/0070671, 2007/0106013, and 2006/0073969.

Further, other than the above-mentioned organic surface crosslinking agent, a polyamine polymer, particularly, having a weight average molecular weight of 3000 or more, further about 5000 to 1000000 and furthermore about 10000 to 500000 may be used simultaneously or separately to improve the liquid permeability potential. Usable polyamine polymers are exemplified in U.S. Pat. Nos. 7,098,284 and 6,849,665, International Publication Nos. 2006/082188, 2006/082189, 2006/082197, 2006/111402, 2006/111403, and 2006/111404. Such polyamine polymers are preferably used for decreasing acid smell as described below.

(Various Conditions)

The use amount of the surface crosslinking agent is properly determined in a range of 0.001 to 10 parts by mass and preferably 0.01 to 5 parts by mass to 100 parts by mass of the water-absorbent resin. Water can be preferably used in combination with the surface crosslinking agent. The amount of water to be used is in a range of 0.5 to 20 parts by mass and preferably 0.5 to 10 parts by mass to 100 parts by mass of the water-absorbent resin. In the case of using the inorganic surface cross-linking agent and the organic surface crosslinking agent in combination, the agents are used in a range of 0.001 to 10 parts by mass and 0.01 to 5 parts by mass, respectively.

Further, at that time, a hydrophilic organic solvent may be used and its amount is in a range of 0 to 10 parts by mass and preferably 0 to 5 parts by mass to 100 parts by mass of the water-absorbent resin. Furthermore, at the time of mixing a cross-linking agent solution with the water-absorbent resin particles, an organic acid (salt), an inorganic acid (salt), a water-insoluble fine particle powder, and a surfactant may coexist to an extent that the effect of the present invention is not hindered, that is, in a range, for example, of 0 to 10 parts by mass, preferably 0 to 5 parts by mass, and more preferably 0 to 1 part by mass. The surfactant to be used and its used amount are exemplified in U.S. Pat. No. 7,473,739, etc.

Further, in the case the water-absorbent resin is highly neutralized (65% by mole or higher and particularly 90% by mole or higher) as described above for decreasing the acid smell, an organic acid and an inorganic acid with acidity (particularly pKa of 6 or higher and further 5 or higher) may be used in combination in the above-mentioned range (the lower limit is generally 0.001 parts by mass or more and further 0.01 parts by mass or more) for accelerating the surface crosslinking. Examples of the organic acid are preferably polymer or non-polymeric organic acids, particularly preferably non-polymeric organic acids, and hydroxy-carboxylic acids such as lactic acid, citric acid, malic acid, etc. are usable. Examples usable as the inorganic acid are sulfuric acid, hydrochloric acid, phosphoric acid, and their salts (acidic salts: e.g. aluminum sulfate), but not limited thereto. Additionally, Lewis acid and Bronsted acid usable for the surface crosslinking are exemplified in U.S. Pat. No. 5,610,208 and US Patent Application Publication No. 2009/0131633.

After being mixed with the surface crosslinking agent, the water-absorbent resin is preferably heated and thereafter cooled if necessary. The heating temperature is 70 to 300° C., preferably 120 to 250° C., and more preferably 150 to 250° C. and the heating time is preferably in a range of 1 minute to 2 hours. The heating treatment can be carried out by a common dryer or heating furnace. In the present invention, the water-absorbent resin with whiteness to a high degree can be provided even by high temperature superheating or air (hot blow) with which conventionally the coloring is intense.

Particularly in the case of aiming a sanitary material (especially a disposable diaper), the water absorbency against pressure (AAP) described below can be improved in a range described below, preferably 20 g/g or higher, and further preferably about 23 to 30 g/g, by such surface crosslinking.

(30) Surface Treatment Agent of Non-Fossil Raw Material

In the case acrylic acid is produced from a non-fossil raw material in the present invention, in terms of sustainability and renewability, a surface treatment agent also derived from a non-fossil raw material may be used as the surface treatment agent. The surface treatment agent is derived from a non-fossil raw material can be judged by, for example 14C, and polyalcohols such as glycerin, and lactic acid and its salt (monovalent salt, particularly polyvalent metal salt, and aluminum salt) may be used as the non-fossil raw material. Especially, from a viewpoint of physical properties, 1,2- (or 1,3-)propanediol and lactic acid may be used as the surface treatment agent and lactic acid and propanediol can be obtained by chemical oxidation and reduction or a fermentation method (biological oxidation) of glycerin and cellulose.

For example, glycerin to be used may be natural, synthesized, or semi-synthesized one; from a viewpoint of Sustainability of the raw material and $CO_2$ emission, natural substance-derived ones, for example, saponified fats and oils are preferable. Also, from a viewpoint of $CO_2$ emission regulation, use of biodiesel is boomed so that use of glycerin, which is a by-product, is one preferable example. The means for obtaining glycerin from fats and oils is not particularly limited and exemplified in, for example, US Patent Application Publication No. 2007/0167642, International Publication Nos. 2007/029851 and 2006/088254, etc.

In the present invention, a glycerin-reduced product, preferably natural glycerin is reduced to propanediol to produce the surface crosslinking agent, and the surface crosslinking of the water-absorbent resin is carried out. Use of such a crosslinking agent is preferable for the water-absorbent resin which is consumed by mass consumption and discarded in terms of the load on the environments and sustainability. Further, as compared with a conventional crosslinking agent obtained by complicated organic synthesis, the crosslinking agent is excellent in the cost and safety, and further the physical properties described below (e.g., water absorbency against pressure) are improved.

The production method of propanediol is not particularly prescribed in the present invention; however, a production method of 1,3-propanediol from glycerin is described in Japanese Patent Application Publication Tokkai No. 2005-102533 and US Patent Application Publication No. 2007/0148749. A production method of 1,2-propanediol from glycerin is described in U.S. Pat. No. 5,276,181, US Patent Application Publication No. 2005/0244312, and Japanese Patent Application Publication Tokkai No. 2007-283175. Further, additionally, propanediol and lactic acid, which are surface treatment agents derived from non-fossil raw materials disclosed in Japanese Patent Application Publication Tokkai No. 2009-96812 (particularly ([0032] to [0047] and its Production Examples and Examples), are also preferably used.

(31) Addition Step of Basic Substance

Since propionic acid and acetic acid have low boiling points as compared with hydroxypropionic acid, in the case the water-absorbent resin obtained by the present invention has a malodor (acid smell) problem, a step of adding a basic substance preferably after the polymerization step is further included when the acrylic acid containing much propionic acid and acetic acid (e.g.; 400 ppm or more) is used.

That is, from a viewpoint of acid smell derived from a saturated organic acid (particularly propionic acid), higher neutralization degree is more preferable, and from a viewpoint of removal at the time of drying, lower neutralization degree is more preferable. Accordingly, from a viewpoint of acid smell, the neutralization degree at the time of polymerization, more preferably the neutralization degree before drying is adjusted to be 80% by mole or lower, more preferably 70% by mole or lower, and even more preferably 60% by mole or lower, or a basic substance is added to the polymer powder surface as a preferable embodiment. Furthermore, as described, in order to lower the acid smell, the neutralization degree of the obtained water-absorbent resin is adjusted to be in a range of 10 to 100% by mole, further in a range of 30 to 95% by mole, and the final neutralization degree is adjusted to be high and is increased preferably to 65% by mole or higher, 70% by mole or higher, 75% by mole or higher, 80% by mole or higher, 85% by mole or higher, and 90% by mole or higher in order. Such adjustment of the neutralization degree is carried out by adding the monomer at the time of polymerization or a base after polymerization.

Addition of a basic substance decreases the acid smell and improves the liquid permeability potential. The basic substance is preferably added after drying, or after crushing, or particularly after surface crosslinking. Consequently, the surfaces of the water-absorbent resin particles are controlled to be basic. Examples usable as the basic substance to be added are inorganic or organic basic substances and further water-soluble bases or water-dispersed bases.

Examples of the organic basic substance are those exemplified in the above-mentioned surface crosslinking agent and may be basic polyvalent metal salts such as aluminum lactate, or organic amines, particularly organic polyamines, especially polyamine polymers with a molecular weight of 3000 or higher, and examples of the inorganic basic substance to be used include particularly carbonates, dicarbonates, concretely carbonates and dicarbonates of alkali metals and particularly sodium carbonate. Usable polyamine polymers are water-soluble polyamine polymers and water-swellable polyamine polymers and preferably water-soluble polyamine polymers, and preferable types and their molecular weights are those exemplified as the above-mentioned surface cross-linking agents.

The use amount of these basic substances is generally 10 parts by mass or lower, further, 0.01 to 5 parts by mass, and particularly 0.1 to 3 parts by mass to 100 parts by mass of the water-absorbent resin. It is in a range of 0.1 to 300 times by mass, further 1.1 to 100 times by mass, and particularly 2 to 50 times by mass with respect to propionic acid. Preferably the basic substance is added to the surfaces of the water-absorbent resin particles, and the surfaces are made to be basic or composition.

The addition of the basic substance to the water-absorbent resin may be carried out directly or in form of a solution or dispersion by using about 0 to 30 parts by mass of a solvent (preferably water). Further, in the case of using a solvent, the solvent may be dried out or allowed to remain, and in terms of water-absorbent speed and impact resistance, a prescribed amount of water is preferably adjusted to remain (e.g., water content 0.1 to 10 mass %).

(32) Other Steps

Besides the above-mentioned steps, as required, a recycling step of the evaporated monomer, a granulating step, a fine powder removing step, a fine powder recycling step, etc. may be added. Further, in order to exhibit the effect of stabilization over time, prevent gel deterioration, or the like, an additive described below may be used for the monomer or the polymer thereof.

(33) Water-Absorbent Resin and its Properties

The water-absorbent resin of the present invention obtained by adding the above-mentioned basic substance is a polyacrylic acid-based water-absorbent resin containing propionic acid ($C_2H_5COOH$) and the basic substance in a total of 500 ppm or more, and preferably containing the basic substances in an amount 1.1 to 1000 times by mass with respect to propionic acid. Preferable basic substances are inorganic salts and powders. Further, in terms of coloring over time, an additive selected from a chelating agent, a reducing inorganic salt, and a hydroxycarboxylic acid is additionally contained. The content of propionic acid is preferably as described above (2 mass % or lower and further 2000 ppm or lower).

Since the water-absorbent resin is provided with improved water absorbency and contains a prescribed amount of propionic acid, it shows an antibacterial effect. Moreover, due to the addition of the basic substance, it is free from acid smell. Further, in the case acrylic acid derived from a non-fossil raw material is used as the above-mentioned acrylic acid, the present invention can provide a polyacrylic acid-based water-absorbent resin with YI≤30 after an accelerating test, which is a polyacrylic acid-based water-absorbent resin derived from a non-fossil raw material. Further in terms of antibacterial property, acetic acid and propionic acid may be contained more. The preferable contents are in the above-mentioned ranges. The acrylic acid is preferably acrylic acid from a non-fossil raw material in an amount of 50 mass % or more, further 70 mass %, and particularly 90 mass % in the raw material for a monomer. In the case the acrylic acid derived from a non-fossil raw material solely by itself cannot satisfy the production amount (supply amount) and is merely a trace component and is not suitable for production of the water-absorbent resin, acrylic acid derived from a fossil raw material is preferably used in combination as required. A preferable ratio in combination is within the above-mentioned range. The water-absorbent resin using the acrylic acid derived from a non-fossil raw material is preferable in terms of sustainability and renewability as a mass consumption material and has white color unlike a conventional one.

In the case a natural substance (particularly, a non-fossil raw material) is used as a raw material of acrylic acid, the ratio of the non-fossil raw material can be specified based on 14C (radioactive carbon)/C (carbon) of the obtained acrylic acid according to US Patent Application Publication No. 2007/219521. The acrylic acid (salt)-based water-absorbent resin obtained from a conventional fossil raw material (particularly, petroleum and further propylene) has 14C/C lower than $1.0 \times 10^{-14}$, whereas the water-absorbent resin of the present invention has 14C/C preferably $1.0 \times 10^{-14}$ or higher, more preferably $1.0 \times 10^{-13}$ or higher, and even more preferably $1.0 \times 10^{-12}$. In the case of using a non-fossil raw material at a ratio of almost 100 mass %, the upper limit is $1.2 \times 10^{-12}$. The 4C/C can be measured by isotope mass spectroscopy and is described in U.S. Pat. Nos. 3,885,155, 4,427,884, 5,438,194, and 5,661,299.

In the case of using a non-fossil raw material and a fossil raw material at the above-mentioned ratio at the time of obtaining acrylic acid, the ratio is determined in a range described in (12), 1:99 to 99:1 and the sustainability ratio (the non-fossil raw material ratio) with the ratio of 14C (radioactive carbon)/C (carbon) is preferably 1 to 99%, more preferably 10 to 90%, further preferably 20 to 80%, and particularly preferably 30 to 70%.

That is, the present invention provides a polyacrylic acid(salt)-based water-absorbent resin using a non-fossil raw material and a fossil raw material in combination for acrylic acid. The ratio for combination use is in the above-mentioned range, and the water-absorbent resin contains propionic acid in 2000 ppm or lower and further contains a basic substance. Since the water-absorbent resin is produced using the acrylic acid derived from a non-fossil raw material and the acrylic acid derived from a fossil raw material in combination, the amount of propionic acid and other trace components before polymerization or after crosslinking can be adjusted to optimum and the risk of raw materials can be hedged. Such a novel water-absorbent resin is excellent in the cost and the stability of raw material sources and easy to contain the trace components such as propionic acid at the optimum ratio and therefore provided with stable physical properties and widely usable as an economical water-absorbent resin with high physical properties. Hydroxypropionic acid and glycerin are used as the non-fossil raw material of acrylic acid, and petroleum and coal are used as the fossil raw material.

(34) Physical Property of Water-Absorbent Resin

In the case of obtaining a sanitary material, particularly a disposable diaper, it is preferable to control at least one of the following (a) to (g), further two or more including AAP, and furthermore three or more by the above-mentioned polymerization and surface crosslinking. In the case the followings are not satisfied, the water-absorbent resin sometimes fails to exhibit sufficient function in form of a high concentration diaper described below. In addition, the preferable particle size and 14C ratio (ratio of non-fossil raw material) are as described above.

That is, the present invention provides a water-absorbent polyacrylic acid (salt) resin with a 14C/C of $1.0 \times 10^{-14}$ or more and hydroxypropionic acid of 2000 ppm or lower. The hydroxypropionic acid in the obtained water-absorbent resin is 2000 ppm or lower, preferably 1500 ppm or lower, more preferably 1000 ppm or lower, further preferably 500 ppm or lower, particularly preferably 300 ppm or lower, and even more preferably 100 ppm or lower. The water-absorbent resin has low residual monomer content and the residual monomer is neither generated nor increased by heating thereafter.

(35) Physical Property of Water-Absorbent Resin

In the case of obtaining a sanitary material, particularly a disposable diaper, it is preferable to control at least one of the followings (a) to (g), further preferably two or more including AAP, and particularly preferably three or more, five or more by the above-mentioned polymerization and surface crosslinking. In the case where the followings are not satisfied, the water-absorbent resin sometimes fails to exhibit sufficient function in the form of a high concentration diaper described below. In addition, the preferable particle size and 14C ratio (the ratio of the non-fossil raw material) are as described above.

(a) Early-Phase Coloring

The water-absorbent resin is excellent in the early-phase coloring, and L value (Lightness) in the Hunter Lab surface color system is preferably 85 or higher, more preferably 87 or higher, and even more preferably 89 or higher. The b value is preferably −5 to 10, more preferably −5 to 5, furthermore preferably −4 to 4; the a value is preferably −2 to 2, more preferably −1 to 1, furthermore preferably −0.5 to 1, and even preferably 0 to 1; YI is preferably 10 or lower, more preferably 8 or lower, and furthermore preferably 6 or lower. WB is preferably 70 or higher, more preferably 75 or higher, and furthermore preferably 77 or higher. The water-absorbent resin is further excellent in the coloring over time and shows sufficient whiteness index even at a high temperature and high humidity, which is an accelerating test (model) for long time preservation.

(b) Absorbency Against Pressure (AAP)

In some cases, in order to prevent a leakage from a diaper, using the above-mentioned polymerization as one example of achieving means, the water absorbency (AAP) to an 0.9 mass % aqueous sodium chloride solution under pressure of 1.9 kPa and further 4.8 kPa is controlled to be preferably 20 (g/g) or higher, more preferably 22 (g/g) or higher, and furthermore preferably 24 (g/g) or higher. The upper limit is about 40 g/g in consideration of the balance with other physical properties.

(c) Permeability Potential (SFC)

In some cases, in order to prevent a leakage from a disposable diaper, using the above-mentioned polymerization as one example of achieving means, the permeability potential under pressure, which is a flow conductivity SFC to an 0.69 mass % aqueous sodium chloride solution, is controlled to be 1 ($\times 10^{-7} \cdot cm^3 \cdot s \cdot g^{-1}$) or higher, preferably 10 ($\times 10^{-7} \cdot cm^3 \cdot s \cdot g^{-1}$) or higher, more preferably 50 ($\times 10^{-7} \cdot cm^3 \cdot s \cdot g^{-1}$) or higher, furthermore preferably 70 ($\times 10^{-7} \cdot cm^3 \cdot s \cdot g^{-1}$) or higher, and even more preferably 100 ($\times 10^{-7} \cdot cm^3 \cdot s \cdot g^{-1}$) or higher.

(d) Water Absorbency without Pressure (CRC)

The water absorbency without pressure (CRC) is controlled to be preferably 10 (g/g) or higher, more preferably 20 (g/g) or higher, furthermore preferably 25 (g/g) or higher, and even more preferably 30 (g/g) or higher. The CRC is more preferable as it is higher, and the upper limit is not particularly limited; however, in consideration of balance with other physical properties, it is preferably 50 (g/g) or lower, more preferably 45 (g/g) or lower, and furthermore preferably 40 (g/g) or lower.

(e) Amount of Water-Soluble Components (Extractables)

The amount of water soluble components is preferably 0 to 35 mass % or lower, more preferably 25 mass % or lower, furthermore preferably 15 mass % or lower, and even more preferably 10 mass % or lower.

(f) Residual Monomer

Using the above-mentioned polymerization as one example of achieving means, the amount of the residual monomer is adjusted to be generally 500 ppm or lower, preferably 0 to 400 ppm, more preferably 0 to 300 ppm, and even more preferably 0 to 200 ppm.

(g) Water Content

The water content is so adjusted preferably as to keep a prescribed amount of water remain (e.g., water content 0.1 to 10 mass % and further 1 to 8 mass %) in terms of water absorbing speed and impact resistance.

(36) Other Additives

Further, in accordance with the purpose, 0 to 3 mass % and preferably 0 to 1 mass % of an oxidizing agent, an antioxidant, water, a polyvalent metal compound, a water-insoluble inorganic or organic powder such as silica and metal soap, etc. as well as a deodorant, an antibacterial agent, a polymer polyamine, pulp, and thermoplastic fibers, etc. may be added to the water-absorbent resin.

(37) Purpose of Use

The purpose of use of the water-absorbent resin of the present invention is not particularly limited; however, it is preferable to use the water-absorbent resin for an absorbent article such as a disposable diaper, a sanitary napkin, an incontinence pad, or the like. Particularly, the water-absorbent resin exhibits excellent performance in case of being used in a high-consistency diaper (one diaper in which a large amount of the water-absorbent resin is used) that conventionally has a problem of malodor and coloring derived from raw materials and particularly in the case of being used in a top layer portion of an absorbent of the absorbent article.

The content (core concentration) of the water-absorbent resin in the absorbent which may contain arbitrarily other absorbent materials (pulp fibers or the like) in the absorbent article is 30 to 100 mass %, preferably 40 to 100 mass %, more preferably 50 to 100 mass %, furthermore preferably 60 to 100 mass %, moreover preferably 70 to 100 mass %, and even more preferably 75 to 95 mass % to exhibit the effect of the present invention. For example, in the case of using the water-absorbent resin of the present invention in the above-mentioned concentration for the top layer portion of absorbent, owing to the high permeability potential (permeability under pressure), the water-absorbent resin is excellent in the diffusion with respect to the absorbed liquid such as urine or the like and the absorption amount of the entire absorbent article such as a disposable diaper can be improved due to the efficient liquid distribution. Further, it is made possible to provide an absorbent article having the absorbent which keeps sanitary white color state.

The above-mentioned absorbent is preferably formed by compression so as to have a density of 0.06 to 0.50 g/cc and a basis weight of 0.01 g/cm$^2$ to 0.20 g/cm$^2$. Further, the above-mentioned absorbent has a thickness of 30 mm or thinner, preferably 20 mm or thinner, and more preferably 10 mm or thinner, and it is possible to provide the absorbent suitable for a disposable diaper reduced in thickness.

(38) Method of Manufacturing Water-Soluble Polyacrylic Acid (Salt)

The above-mentioned method of manufacturing a water-absorbent resin of this application can be employed in the case of manufacturing a water-soluble resin such as a water-soluble polyacrylic acid (salt). At that time, the water-soluble resin such as a water-soluble polyacrylic acid (salt) may be manufactured by using no crosslinking agent or lowering the molecular weight in accordance with the polymerization conditions.

The present invention also provides a method of producing a hydrophilic resin as a boarder concept of the water-absorbent resin, that is, a hydrophilic resin selected from a water-absorbent resin and a water-soluble resin.

The method of manufacturing a water-absorbent resin is described above and a polyacrylic acid may be obtained by polymerizing acrylic acid by setting conditions where a water-soluble resin is produced (e.g. without using a crosslinking agent) and at that time, in the case of a water-soluble resin, drying is optional and an aqueous solution after polymerization may be used as it is or may be properly condensed or diluted. The weight average molecular weight of the water-soluble resin is 300 to 10000000, and preferably 500 to 5000000 and the above-mentioned manufacturing conditions (2) to (28) may be properly employed in a range of giving a water-soluble resin. The water-soluble resin may be used as a precursor for a water-absorbent resin (further crosslinked to be water-swellable or water-insoluble) and also as a builder or a thickener.

EXAMPLES (Evaluation of Physical Properties)
(a) Early-Phase Coloring

The early-phase coloring was measured by using a spectroscopic colorimeter SZ-Σ80COLOR MEASURING SYSTEM (NIPPON DENSHOKU INDUSTRIES CO., LTD.). The set conditions for the measurement were as follows: reflection measurement was employed, a powder/paste container, which is an accessory for the spectroscopic colorimeter and having an inner diameter of 30 mm and a height of 12 mm, was used; a powder/paste white plate No. 2 having a rounded shape was used as a standard; and a 30φ projector pipe was used. The accessory powder/paste container was filled with about 5 g of the water-absorbent resin.

(b) Coloring Over Time

The water-absorbent resin was left under high temperature and high humid condition (70° C., 75% RH) for 10 days and the color was measured by the above-mentioned method described in (a)

(c) Other Physical Properties

According to the above-mentioned ERT of EDANA and US Patent Application Publication No. 2006/204755, water absorbency without pressure (CRC) with 0.9 mass % normal saline solution, pH soluble matter, residual acrylic acid, and permeability potential (SFC) were measured.

Manufacturing Example 1

After 200 ppm of methoxyphenol as a polymerization inhibitor was added to an aqueous 10 mass % 3-hydroxypropionic acid solution obtained by fermentation of an aqueous glucose solution, dehydration reaction was caused with a phosphoric acid catalyst by heating to obtain an aqueous acrylic acid solution. The obtained acrylic acid solution was distilled to remove β-hydroxypropionic acid with a high boiling point. At the time of distillation, 60 ppm of p-methoxyphenol was added. Acrylic acid (1) (p-methoxyphenol 60 ppm) with ND (not detectable) of hydroxypropionic acid and respective ND of protoanemonin, ally acrylate, allyl alcohol, aldehyde contents, and maleic acid was obtained. A method of manufacturing acrylic acid from β-hydroxypropionic acid is disclosed in International Publication No. 2006/092271 and International Publication No. 2008/023039. In addition, the 14C amount of the obtained acrylic acid showed same value with the theoretical value (value of non-fossil raw material).

Manufacturing Example 2

Water was collected from the reaction gas obtained in vapor-phase oxidation of propylene in an absorption tower to obtain an aqueous acrylic acid solution. Next, the aqueous acrylic acid solution was supplied to a solvent separation tower and water and impurities with low boiling point such as acetic acid were removed by distillation using an azeotropic solvent to obtain crude acrylic acid containing 250 ppm of protoanemonin and 260 ppm of furfural. The 14C amount of the obtained acrylic acid was coincident with the theoretical value (value of non-fossil raw material).

The crude acrylic acid was supplied to the bottom of a tower for separating impurities with high boiling point having a bank-less porous plate of 30 steps and distillation was carried out at a refluxing ratio of 1 to remove impurities with high boiling point such as dimers including maleic acid and acrylic acid (acrylic acid dimers) together with protoanemonin. As a result, acrylic acid (2) containing 13 ppm of protoanemonin and 230 ppm of furfural was obtained from the tower summit.

Manufacturing Example 3

In Manufacturing Example 2, as an aldehyde treatment agent, 400 ppm of hydrazine hydrate was added to the acrylic acid (2) and distillation was carried out in a single distillation apparatus to decrease the content of furfural to 1 ppm. Acrylic acid (3) containing 13 ppm of protoanemonin and 1 ppm of furfural was obtained.

Manufacturing Example 4

Purified acrylic acid (4) (content of protoanemonin 17 ppm) with a content of furfural decreased to 1 ppm was obtained in the same manner as in Manufacturing Example 2 while the bank-free porous plates being 30 steps, except that the refluxing ratio was changed to 0.9.

(Monomer Preparation Method 1)

The acrylic acid (1) was added to an aqueous NaOH solution obtained using caustic sodium containing 1.4 ppm of iron (based on $Fe_2O_3$) under cooling condition (liquid temperature of 20° C. at the time of neutralization) to carry out neutralization at 75% by mole. A monomer with 100 ppm content of 3-hydroxypropionic acid (to monomer) was obtained. The Fe amount in the monomer was about 0.7 ppm, derived from NaOH.

(Monomer Preparation Method 2)

A monomer with 2100 ppm content of 3-hydroxypropionic acid was obtained by changing the neutralization temperature to 60° C. in the monomer preparation method 1. It could be understood that the amount of 3-hydroxypropionic acid after neutralization was significantly different even in same acrylic acid in accordance with the neutralization temperature.

(Monomer Preparation Method 3)

A monomer with 3200 ppm content of 3-hydroxypropionic acid was obtained by performing neutralization 20 days after the refining of acrylic acid (1) in the monomer preparation method 1. It could be understood that the amount of 3-hydroxypropionic acid after neutralization was significantly different even in same acrylic acid in accordance with the time after refining.

(Monomer Preparation Method 4)

In the monomer preparation method 3, after the acrylic acid (1) was purified, an aqueous 62 mass % acrylic acid solution was obtained according to Example 2 of International Publication No. 2008/023039 and thereafter, the solution was circulated and stored at 40° C. and neutralized after 24 hours to obtain a monomer having a content of 3-hydroxypropionic acid of 2500 ppm. It can be understood that the amount of 3-hydroxypropionic acid after neutralization is significantly different in accordance with the time after purification even in the case where the same acrylic acid was used.

Example 1

The acrylic acid (1) obtained in Manufacturing Example 1 was neutralized according to preparation method 1 to obtain an aqueous sodium acrylate solution (1) with a neutralization ratio of 75% by mole and a concentration of 35 mass % and thereafter, 0.05% by mole (to monomer) of inner crosslinking agent, polyethylene glycol diacrylate, was dissolved to obtain a monomer (1) having a content of 3-hydroxypropionic acid of 100 ppm. The monomer (1) in an amount of 350 g was immediately (within 3 minutes) put into a 1 L-capacity cylindrical container inside of which was degassed for 20 minutes by bubbling nitrogen at 2 L/minute. Next, an aqueous 0.12 g/mole (to monomer) sodium persulfate and 0.005 g/mole (to monomer) L-ascorbic acid solution was added under stirring with a stirrer to allow polymerization to initiate. The stirring was stopped after initiating the polymerization to carry out static aqueous solution polymerization. After the peak polymerization temperature 110° C. was shown after about 14 minutes, it passed 30 minutes and then the product was taken out of polymerization container.

The obtained hydrogel-containing crosslinked polymer (1) was pulverized by a meat chopper (hole 8 mm) at 45° C., and immediately loaded to a drier (within 3 minutes) and heat dried at air blow of 1.8 m/second for 20 minutes with a hot air drier at 170° C. Further, the dried polymer (solid matter, about 95 mass %) was pulverized by a roll mill and classified by a JIS standard sieve into 850 to 150 μm to obtain a water-absorbent resin powder (1). The 14C amount of the obtained water-absorbent resin was coincident with the theoretical value (value of non-fossil raw material).

Examples 2 to 4

Monomer polymerization and drying were carried out in the same manner as in Example 1, except that the monomer having a content of 3-hydroxypropionic acid of 100 ppm was changed to acrylic acid having a content of 3-hydroxypropionic acid of 500 ppm, 1000 ppm, and 1500 ppm, respectively. Water-absorbent resin powders (2) to (4) were obtained. The results are shown in Table 1.

Examples 5 and 6

The content of Fe in the monomer was adjusted to 1.7 ppm or ND by separately changing the amount of Fe in NaOH. Water-absorbent resin powders (5) and (6) were obtained. From the conduction time in Table 1, it can be understood that a specified amount of iron is preferable for polymerization.

Comparative Example 1

A monomer was prepared by using the acrylic acid (3) (propylene raw material) obtained in Manufacturing Example 3 as acrylic acid to be used in Example 1. Thereafter, polymerization and drying were carried out in the same manner as in Example 1 to obtain a comparative water-absorbent resin powder (1).

Comparative Example 2

A monomer was prepared by using the acrylic acid (2) (propylene raw material) obtained in Manufacturing Example 2 as acrylic acid to be used in Example 1. Thereafter, polymerization and drying were carried out in the same manner as in Example 1 to obtain a comparative water-absorbent resin powder (2).

Comparative Example 3

A monomer was prepared by employing Preparation Method (2) for the acrylic acid (1) obtained in Manufacturing Example 1 in Example 1. Thereafter, polymerization and drying were carried out in the same manner as in Example 1. A comparative water-absorbent resin powder (3) was obtained. The results are shown in Table 1.

(Results)

The amount of residual monomer in each of the water-absorbent resins obtained by using the above-mentioned acrylic acid having a content of p-methoxyphenol of 60 ppm. With no need of complicated purification or hydrazine treatment unlike conventional manner, Examples 1 to 4 using the acrylic acid obtained from 3-hydroxypropionic acid could simply provided water-absorbent resins with low residual monomer content. Further, even in the case of using the same acrylic acid obtained from 3-hydroxypropionic acid, it was found that the amount of Fe affects on polymerization rate, amount of residual monomer and coloration (Tables 1 and 2).

TABLE 1

|  |  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| Acrylic acid |  |  |  |  |  |  |  |  |  |  |
| Raw material of acrylic acid |  | 3-hydroxypropionic acid | ← | ← | ← | ← | ← | propylene | propylene | 3-hydroxypropionic acid |
| 3-hydroxypropionic acid Monomer | ppm | 0 | 500 | 1000 | 1500 | ← | ← | 10 or less | 10 or less | 0 |
| Fe (in terms of $Fe_2O_3$) | ppm | 0.5 | ← | ← | ← | 1.7 | N.D | 0.5 | ← | ← |
| 3-hydroxypropionic acid Water-absorbent resin powder | ppm | 100 | 500 | 1100 | 1600 | 1600 | 1600 | 100 | 100 | 2100 |
| Conduction time | min. | 0.5 | 0.5 | 0.5 | 0.5 | 1 | 4 | 2 | 5 | 0.5 |
| Residual monomer | ppm | 310 | 370 | 380 | 430 | 480 |  | 720 |  | 500 | note)
Other physical properties of water-absorbent resins are all the same as described below. Solid matter; 95%, Water absorbency (CRC); 39 (g/g), water-soluble content; 15%

TABLE 2

|  |  | Example 4 | Example 5 |
|---|---|---|---|
| Content of Fe | ppm | 0.5 | 1.7 |
| coloration (after drying) | L | 89.5 | 89.1 |
|  | a | −0.08 | 0.1 |
|  | b | 4.6 | 2.6 |
| coloration (after high humid condition) | L | 63 | 51.9 |
|  | a | 3.6 | 4.1 |
|  | b | 12.8 | 13.9 |
| Deterioration of gel |  | none | minimum | note)
Deterioration of gel swollen as much as 25 times at 37° C. for 16 hours.

Example 7

After a mixture of 0.05 parts by mass of ethylene glycol diglycidyl ether as a surface crosslinking agent (product name: Denacol (registered trade name) EX-810, manufactured by Nagase Chemicals Ltd.)/3 parts by mass of water/1 part by mass of isopropyl alcohol was sprayed and added to 100 parts by weight of the water-absorbent resin (1) obtained in Example 1, heating treatment was carried out at 195° C. in an oil bath for 60 minutes to obtain a surface crosslinked water-absorbent resin powder (7).

Examples 8 to 10

Surface crosslinked water-absorbent resin powders (8) to (10) were obtained by using the water-absorbent resin powders (2) to (4) in place of the water-absorbent resin powder (1) in the surface crosslinking in Example 7.

TABLE 3

| | | water-absorbent resin after surface crosslinking | | |
|---|---|---|---|---|
|  | Raw material | Residual monomer after surface crosslinking ppm | Increment of residual monomer ppm | 3-hydroxypropionic acid in water-absorbent resin ppm |
| Example 7 | Water-absorbent resin powder (1) | 310 | 0 | 200< |
| Example 8 | Water-absorbent resin powder (2) | 430 | 60 |  |
| Example 9 | Water-absorbent resin powder (3) | 540 | 160 | 860 |
| Example 10 | Water-absorbent resin powder (4) | 680 | 250 | 1030 |
| Comparative Example 3 | Comparative water-absorbent resin powder (3) | 900 | 400 |  | note)
Other physical properties of water-absorbent resins are all the same as described below. Water absorbency against pressure under 50 $g/cm^2$ is 24 (g/g)

Example 11

In the polymerization in Example 1, 0.1 mass % (to acrylic acid) of propionic acid was added and polymerization was carried out in the same manner. A water-absorbent resin powder (11) obtained by drying and pulverization carried out in the same manner as in Example 1 was improved in water absorbency by about 1 g/g. The propionic acid almost completely remained in the polymerization and 40 mass % of the amount added in the drying step was removed.

Example 12

Granulation was carried out after addition of water and $Na_2CO_3$ in amounts to be 5 mass % and 0.5 mass %, respectively, to the water-absorbent resin powder (11). As compared with the water-absorbent resin powder (11), the obtained water-absorbent resin powder (12) was deodorized (acid smell was decreased). Also, when granulation was carried out after addition of water and polyethyleneimine (P-1000, manufactured by Nippon Shokubai Co., Ltd.) in amounts to be 5 mass % and 0.5 mass %, respectively, to the water-absorbent resin powder (11), the obtained water-absorbent resin powder (12') was also similarly deodorized (acid smell was decreased). Consequently, a means of adding basic substances (e.g., carbonates and polyamines) to the surface of the water-absorbent resin was effective to lower acid smell.

Example 13

In the polymerization in Example 1, the polymerization was carried out after 2 hours from preparation of the monomer. A water-absorbent resin powder (13) obtained by polymerization and pulverization carried out in the same manner as in Example 1 had a residual monomer content increased by 50 ppm.

(Manufacturing Example of Propanediol Derived from Natural Substance)

The following reaction was carried out using glycerin derived from a natural substance (glycerin obtained by saponification of fats and oils). That is, MgO was prepared by firing basic magnesium carbonate (Ishizu Kagaku Co., Ltd.) at 500° C. for 3 hours under air flow. As a catalyst of glycerin reduction, 0.10 g of the prepared MgO and 0.05 g of Ru/C (H1002 P/W, produced by Degussa Co., Ltd, Ru concentration 5 mass %, water content 55 mass %) were loaded to a 15 ml capacity autoclave. After 4.2 g of an 20 mass % aqueous glycerin solution was further loaded to the autoclave, the air in the autoclave was replace with $N_2$ gas. Next, after the inside of the autoclave was heated to 180° C., $H_2$ gas was introduced until the pressure was increased to 8 MPa and reduction reaction of glycerin to 1,2-propanediol was carried out in batch way under condition of 180° C. for 10 hours. The 14C amount of the obtained propanediol was coincident with the theoretical value (the value of non-fossil raw material).

Example 14

Surface crosslinking was carried out using 0.8 parts by mass of 1,2-propanediol obtained in the above-mentioned manufacturing examples in place of 0.05 parts by mass of ethylene glycol diglycidyl ether as the surface crosslinking agent in Example 7. The results are shown in Table 4.

TABLE 4

|  |  | Example 14 |
| --- | --- | --- |
| water absorbency (CRC) | g/g | 32 |
| water absorbency against pressure(AAP) | g/g | 26 |
| Permeability potential (SFC) | $\times 10^{-7} \cdot cm^3 \cdot sec \cdot g^{-1}$ | 10 |

Example 15

Propionic acid removal was carried out in a hydrophobic organic solvent in place of propionic acid removal after polymerization by hot air drying at 170° C. in Example 11.

That is, polyethylene glycol diacrylate (0.05% by mole) as an inner crosslinking agent and 2.0 mass % of hydroxyethyl cellulose HEC EP 850 (manufactured by Daicel Chemical Industries, Ltd.) as a thickener, and 0.12 g/mole (to monomer) of sodium persulfate as a polymerization initiator were dissolved in an aqueous sodium acrylate solution with a concentration of 35 mass % and a neutralization ratio of 75% by mole using acrylic acid derived from a non-fossil raw material and containing 1.0 mass % of propionic acid and the resulting aqueous solution was purged with nitrogen. The aqueous monomer solution was dropwise added to, through a dropping funnel, a four-neck flask purged with nitrogen and including 200 g of cyclohexane containing 2.8 mass % of sucrose-fatty acid ester F-50 (Dai-Ichi Kogyo Seiyaku Co., Ltd.) and equipped with stirring blades to disperse the solution in the form of droplets of about 1 mm to 0.1 mm in the cyclohexane. Polymerization was carried out for 40 minutes by keeping the bath temperature at 60° C. and next, the bath temperature was adjusted to 85 to 92° C. to carry out azeotropic dehydration for 90 minutes and thus a dried and spherical water-absorbent resin powder (15) was obtained. The amount of propionic acid in the obtained water-absorbent resin powder (15) was 0.25 mass % (removal ratio was 75%).

As compared with the hot air-dried water-absorbent resin powder in Table 1 (removal ratio: around 35%), the water-absorbent resin powder subjected to azeotropic dehydration after the reverse-phase suspension polymerization has a high propionic acid removal ratio (removal ratio: about 75%) and is free from a problem of malodor. Consequently, acrylic acid derived from a non-fossil raw material contains a large quantity of a saturated organic acid (particularly, propionic acid) and in the present invention, it can be used as it is and there is no need to purify the acrylic acid to an excess extent. In addition, for comparison, although acrylic acid containing 1.0 mass % of propionic acid was distilled twice, propionic acid having a boiling point close to that of acrylic acid could be scarcely removed.

Example 16

After polyethylene glycol diacrylate (0.06% by mole) as an inner crosslinking agent and 50 ppm of a diethylene triamine pentaacetic acid trisodium salt as a chelating agent were dissolved in an aqueous sodium acrylate solution with a concentration of 45 mass % and a neutralization ratio of 80% by mole (content of 3-hydroxypropionic acid is 100 ppm) using acrylic acid containing 1.0 mass % of propionic acid, the solution was heated to 95° C. and 0.02 g/mole (to monomer) of a water-soluble azo initiator V-50 (Wako Pure Chemical Industries, Ltd.) and 0.12 g/mole (to monomer) of sodium persulfate were added to carry out polymerization. The gel after the polymerization was made small by a meat chopper and the hydrogel was further heated and dried at 170° C. for 20 minutes to obtain a water-absorbent resin powder (16). The results are shown in Table 5.

Example 17

A water-absorbent resin powder (17) with a water absorbency (CRC) of 35.9 g/g was obtained by carrying out polymerization and drying in the same manner as in Example 16 (neutralization ratio 80. % by mole and propionic acid 1 mass %), except that the neutralization ratio of the monomer was changed to 70% by mole. The results are shown in Table 5.

Example 18

A water-absorbent resin powder (18) was obtained by carrying out polymerization and drying in the same manner as in Example 16, except that the neutralization ratio of the monomer was changed to 50% by mole. The results are shown in Table 5.

Example 19

The water-absorbent resin powder (18) obtained in Example 18 was mixed with sodium carbonate according to Example 12 to make the surface of the resin powder basic. The results are shown in Table 5.

Comparative Example 4

A comparative water-absorbent resin powder (4) with a water absorbency (CRC) of 32.8 g/g was obtained by carrying out polymerization, drying, and pulverization in the same manner as in Example 17 (neutralization ratio 70% by mole, propionic acid 1 mass %), except that the amount of propionic acid was changed to 100 ppm in Example 17.

TABLE 5 polymerization with the content of 1 mass % of propionic acid and removal thereof after polymerization

| Examples | Neutralization ratio [mole %] | Drying | Propionic acid removal ratio | Acid smell |
|---|---|---|---|---|
| Example 15 | 75 | azeotropic dehydration | 75 | Odorless |
| Example 16 | 80 | Hot air dying at 170° C. | 37 | Nearly odorless |
| Example 17 | 70 | Same as above | 40 | Nearly odorless |
| Example 18 | 50 | Same as above | 54 | Slightly odor |
| Example 19 | 50→70 | Same as above | 47 | Odorless |

(Conclusion)

With respect to a saturated organic acid contained in acrylic acid derived from a non-fossil raw material in a large amount, particularly, propionic acid, the acid is scarcely separated by distillation of the raw material acrylic acid, whereas it can be efficiently removed from the water-absorbent resin after polymerization by drying, preferably hot air drying, and further azeotropic dehydration. As the neutralization ratio is lower, it is preferable for the removal; however in terms of dor, it is preferable to further add a basic substance.

Further, in comparison of Example 17 and Comparative Example 4, it can be understood that presence of 1 mass % of propionic acid in the monomer can increase the water absorbency (CRC) of the obtained water-absorbent resin by about 3 g/g.

Example 20

The same operation as in Example 1 was carried out, except that 20 ppm of phenol ($C_6H_5OH$) was added to the monomer at the time of polymerization in Example 1. The physical properties of the obtained water-absorbent resin were almost the same as those of Example L however, the YI value was improved from 7.1 to 6.6.

Example 21

Polymerization Example of Water-Absorbent Resin

In addition to the manufacturing examples of the above-mentioned water-absorbent resin, a water-soluble resin was manufactured as a hydrophilic resin.

That is, 2000 g of an aqueous sodium acrylate solution with a concentration of 40 mass % (neutralization ratio 100% by mole, 0.3 mass % of propionic acid, 100 ppm of 3-hydroxypropionic acid; a neutralized substance of acrylic acid derived from 3-hydroxypropionic acid and), which was previously purged with nitrogen, 0.04 g of ammonium persulfate, and 0.02 g of sodium hydrogen Sulfite were put through a raw material throwing inlet of an injection polymerization apparatus sealed by inserting a rubber packing between two stainless plates inner sides of which were coated with a fluoro resin coating and fixing the stainless plates with bolts and nuts (inner capacity 1.6 L, height 230 mm×width 230 mm×depth 30 mm) and air was discharged through an air discharge port. The injection polymerization apparatus was put in a water bath equipped with a stirrer and a temperature controller, and while the temperature of the water bath is kept at 30° C., and reaction heat is removed, polymerization was carried out. After 5 hours from the initiation of polymerization, a hydrogel-containing polymer was taken out of the injection polymerization apparatus and the obtained product was formed into a string-like form by a meat chopper and successively subjected to drying and pulverization in the same manner as in Example 1 to obtain a water-soluble polymer powder. The residual monomer was in 2000 ppm and when the viscosity of an aqueous solution obtained by dissolving 0.2 g of the powder in 100 g of water was measured at 25° C. using a Brookfield viscometer, it was 1100 cp. Further, since the neutralization ratio was 100% by mole, substantially no acid smell was emitted.

Example 22

A water-absorbent resin (21) with a neutralization ratio of 100% by mole was obtained by carrying out polymerization and drying in the same manner as in Example 1, except that 0.1% by mole of polyethylene glycol diglycidyl ether was used as the inner crosslinking agent in Example 1. Since the neutralization ratio was 100% by mole, substantially no acid smell was emitted.

Example 23

In Example 16, the drying of the aqueous solution after polymerization was changed to azeotropic dehydration according to Example 15. That is, the gel after polymerization obtained in Example 16 was made small (about 1 mm) by a meat chopper and the obtained hydrogel was dispersed in cyclohexane containing sucrose-fatty acid ester F-50 (Dai-Ichi Kogyo Seiyaku Co., Ltd.) while stirring and azeotropically dehydrated to obtain a water-absorbent resin (23) from which 72 mass % of propionic acid was removed after drying.

Example 24

A mixture of 0.5 parts by mass of glycerin/2 parts by mass of water was mixed with 100 parts by mass of the water-absorbent resin (16) with a neutralization ratio of 80% by mole obtained in Example 16 and further surface crosslinking was carried out at a heating temperature of 180° C. for 30 minutes to consequently obtain 18 g/g of water absorbency against pressure (AAP).

Example 25

Surface crosslinking was carried out in the same manner as in Example 24, except that the water-absorbent resin (18) with a neutralization ratio of 50% by mole obtained in Example 18 was used. The water absorbency against pressure (AAP) was 21 g/g.

Example 26

Phosphoric acid in an amount of 0.5 parts by mass was used in combination with the surface crosslinking agent in Example 24 and as a result, the water absorbency against pressure (AAP) was 22 g/g.

From Examples 23 to 25, in terms of acid smell, high neutralization (e.g., 80% by mole of neutralization) is preferable, however the surface crosslinking efficiency is low and therefore, it is preferable to use an organic acid or an inorganic acid for the surface treatment agent.

Example 27

A water-absorbent resin (27) with a water absorbency (CRC) of 36.5 g/g was obtained by carrying out polymerization, drying and pulverization in the same manner as in Example 16, except that the amount of propionic acid was changed to be 3 mass % in Example 17 (neutralization ratio 70% by mole, amount of propionic acid 1 mass %). In terms of a problem of acid smell and improvement of the water absorbency (CRC), it can be understood that the amount of propionic acid is sufficient to be 1 mass % in high temperature polymerization.

Example 28

In Example 17 (neutralization ratio 70% by mole, amount of propionic acid 1 mass %), since newly prepared acrylic acid derived from a non-fossil raw material contained 1.2 mass % of propionic acid, acrylic acid containing 0.01 mass % of propionic acid and derived from a fossil raw material was mixed with it at a mixing ratio of 83:17 to adjust the amount of propionic acid to 1% and polymerization was carried out and consequently, the same results as those of Example 17 was obtained. It can be understood that mixing of a plurality of acrylic acids, particularly, mixing of a fossil raw material and a non-fossil raw material, can make the trace components (e.g. propionic acid) stable and as a result the physical properties are also stabilized. The 14C amount of the obtained water-absorbent resin (28) was coincident with the theoretical value (ratio of fossil raw material and non-fossil raw material).

Example 29

A water-absorbent resin (29) with a water absorbency (CRC) of 41 g/g was obtained by carrying out polymerization, drying and pulverization in the same manner as in Example 1 (CRC=39 g/g), except that the amount of propionic acid was further changed to 3 mass % in Example 1. It can be understood that propionic acid can improve the water absorbency (CRC) similarly to Example 17. A preferable manufacturing example of acrylic acid containing a prescribed amount of propionic acid is the acrylic acid derived from a non-fossil raw material and it can be preferably used in terms of improvement of the water absorbency (CRC).

Example 30

A water-absorbent resin (30) with a water absorbency (CRC) of 40 g/g was obtained by carrying out polymerization, drying and pulverization in the same manner as in Example 1 (CRC=39 g/g), except that the amount of propionic acid was further changed to 3 mass % in Example 1. It can be understood that acetic acid can improve the water absorbency (CRC), although the effect thereof was lower than that of propionic acid. A preferable manufacturing example of acrylic acid containing a prescribed amount of acetic acid is the acrylic acid derived from a non-fossil raw material and it can be preferably used in terms of improvement of the water absorbency (CRC).

Industrial Applicability

Without carrying out complicated purification in the purification step of acrylic acid or hydrazine treatment (aldehyde removal treatment), or without carrying out excess purification of acrylic acid, which is a raw material of a water-absorbent resin, particularly acrylic acid derived from a non-fossil raw material, the physical properties of a water-absorbent resin with low residual monomer content and acid smell can be stabilized or improved.

The invention claimed is:

1. A method of manufacturing a hydrophilic polyacrylic acid (salt) resin selected from the group consisting of a water-absorbent resin and a water-soluble resin, comprising the steps of:
    a preparation step in which a monomer is prepared from acrylic acid,
    a polymerization step in which the monomer is polymerized, and
    optionally a drying step in which an obtained hydrogel is dried,
    wherein
        acrylic acid obtained by dehydration reaction of hydroxypropionic acid (salt) obtained from a non-fossil raw material is used as the acrylic acid; and
        the acrylic acid obtained by dehydration reaction of hydroxypropionic acid (salt) has a water content of 1 mass % or lower; and
        the preparation step in which the monomer is prepared from acrylic acid is conducted within 72 hours after purification; and
        polymerization is carried out with the content of the hydroxypropionic acid (salt) in the monomer being adjusted to 2000 ppm or lower; and/or
        acrylic acid obtained by dehydration reaction of hydroxypropionic acid (salt) obtained from a non-fossil raw material is used as the acrylic acid and the amount of a saturated organic carboxylic acid in the monomer is adjusted to more than 1000 ppm to 2 mass % or lower to carry out polymerization; and
        at least a portion of the saturated organic carboxylic acid is volatilized and optionally trapped in the drying step and thereafter.

2. The manufacturing method according to claim 1, wherein the hydrophilic polyacrylic acid (salt) resin is a polyacrylic acid (salt)-based water-absorbent resin;
    acrylic acid obtained by dehydration reaction of hydroxypropionic acid (salt) obtained from a non-fossil raw material is used as the acrylic acid and polymerization is carried out with the content of the hydroxypropionic acid (salt) in the monomer being adjusted to 2000 ppm or lower;
    and/or at least a portion of the saturated organic carboxylic acid is volatilized and optionally trapped in the drying step and thereafter.

3. The manufacturing method according to claim 1, wherein the content of one or more of protoanemonin, allyl acrylate, allyl alcohol, an aldehyde component, maleic acid, and benzoic acid in the acrylic acid is 0 to 20 ppm; or the saturated organic carboxylic acid in the acrylic acid is 300 ppm or more; or 3-hydroxypropionic acid is 200 ppm or lower in the monomer.

4. The manufacturing method according to claim 1, wherein a polymerization inhibitor is used in the dehydration step and further the inhibitor is removed.

5. The manufacturing method according to claim 1, wherein an acrylic acid derived from a fossil raw material and an acrylic acid other than the acrylic acid obtained by dehydration reaction of hydroxypropionic acid (salt) derived from the non-fossil raw material are further used in combination as the monomer.

6. The manufacturing method according to claim 1, wherein the monomer contains 10 to 200 ppm of a polymerization inhibitor besides phenol ($C_6H_5OH$); or Fe (in terms of $Fe_2O_3$) in the monomer is 0.002 to 2 ppm.

7. The manufacturing method according to claim 1, wherein the acrylic acid contains the saturated organic carboxylic acid and a saturated aliphatic carboxylic acid is volatilized until the content reaches 2000 ppm or lower, and optionally trapped in the drying step and thereafter.

8. The manufacturing method according to claim 1, wherein a residual monomer in the obtained water-absorbent resin is 400 ppm or lower.

9. The manufacturing method according to claim 1 further comprising the step of surface-crosslinking the water-absorbent resin with a surface cross-linking agent of a compound derived from a non-fossil raw material.

10. The manufacturing method according to claim 1, further comprising the step of surface-crosslinking the water-absorbent resin with a surface cross-linking agent containing propanediol or lactic acid.

11. The manufacturing method according to claim 1, further comprising the step of adding a basic substance after the drying step.

12. The manufacturing method according to claim 1, wherein an acrylic acid other than the acrylic acid obtained by dehydration reaction of hydroxypropionic acid (salt) is used in combination as the monomer.

13. The manufacturing method according to claim 1, further comprising a neutralization step, wherein the neutralization step is conducted within 72 hours after refining the acrylic acid.

* * * * *